(12) United States Patent
Moon

(10) Patent No.: US 12,211,391 B2
(45) Date of Patent: Jan. 28, 2025

(54) CONTROL SYSTEM FOR CONTROLLING UNMANNED AUTONOMOUS SYSTEMS

(71) Applicant: 10757969 CANADA CORPORATION, Toronto (CA)

(72) Inventor: Dae Sun Moon, Toronto (CA)

(73) Assignee: 10757969 CANADA CORPORATION, Toronto (CA)

(*) Notice: Subject to any disclaimer, the term of this patent is extended or adjusted under 35 U.S.C. 154(b) by 0 days.

(21) Appl. No.: 17/942,422

(22) Filed: Sep. 12, 2022

(65) Prior Publication Data

US 2023/0073270 A1 Mar. 9, 2023

Related U.S. Application Data

(63) Continuation of application No. 16/603,980, filed as application No. PCT/IB2018/006000 on Dec. 13, 2018, now Pat. No. 11,443,643.

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *G08G 5/0013* (2013.01); *G08G 5/006* (2013.01); *G08G 5/045* (2013.01); *H04Q 11/04* (2013.01); *H04W 4/021* (2013.01); *H04W 4/024* (2018.02); *B64U 2201/10* (2023.01)

(58) Field of Classification Search
CPC .................................................. G08G 5/0069
See application file for complete search history.

(56) References Cited

U.S. PATENT DOCUMENTS

| 5,170,352 A | 12/1992 | McTamaney et al. |
| 7,737,878 B2 | 6/2010 | van Tooren et al. |

(Continued)

FOREIGN PATENT DOCUMENTS

| EP | 3251108 A1 | 12/2017 | ............ G08G 5/006 |
| WO | 2016154551 A1 | 9/2016 | |

OTHER PUBLICATIONS

Google Machine Translation of JP2019504418A (2016).*
(Continued)

*Primary Examiner* — Jean Paul Cass
(74) *Attorney, Agent, or Firm* — Norton Rose Fulbright Canada LLP

(57) ABSTRACT

The present disclosure provides a control system for controlling unmanned autonomous systems (UAS). The control system comprises of an application user system 102 to operate the UAS, an operating system 103, a virtual road system (VRS) 109 and a virtual packet 501. The virtual packet 501 created as a boundary around the UAS defined by application user system 102 or VRS 109. The operating system 103 includes a machine learning processing unit (MLPU) 104 configured for positioning the UAS, detecting collision within path of the virtual packet 901. The VRS 109 configured to generate a virtual roadway 902 using architecture for routing the UAS. The routing and controlling of UAS by the VRS 109 is based on request received from the MLPU 104, application zone packet parameters and actual position co-ordinates received from the MLPU 104.

20 Claims, 19 Drawing Sheets

(51) Int. Cl.
  *G08G 5/04*    (2006.01)
  *H04Q 11/04*   (2006.01)
  *H04W 4/021*   (2018.01)
  *H04W 4/024*   (2018.01)

(56) References Cited

U.S. PATENT DOCUMENTS

| | | | |
|---|---|---|---|
| 9,434,267 B2 | 9/2016 | Wang | B64C 39/024 |
| 9,714,012 B1 | 7/2017 | Hoareau | H01M 10/4207 |
| 9,764,703 B2 | 9/2017 | Hoareau | B60R 16/033 |
| 9,815,633 B1 | 11/2017 | Kisser | G06Q 10/0832 |
| 9,950,814 B1 | 4/2018 | Beckman | B61L 23/04 |
| 10,023,309 B2 | 7/2018 | Brown | B64D 47/06 |
| 10,195,952 B2 | 2/2019 | Wang | B64C 29/0016 |
| 10,332,405 B2 | 6/2019 | Kopardekar | G08G 5/0043 |
| 10,363,826 B2 | 7/2019 | Wang | B60L 53/80 |
| 10,384,692 B2 | 8/2019 | Beckman | B25J 9/1679 |
| 10,421,542 B2 | 9/2019 | Beckman | B61L 25/025 |
| 10,453,348 B2 | 10/2019 | Speasl | B64C 39/024 |
| 10,467,685 B1 | 11/2019 | Brisson | G06Q 30/0645 |
| 10,493,863 B1 | 12/2019 | Thrun | B64D 5/00 |
| 10,532,815 B1 | 1/2020 | Thrun | H01M 10/441 |
| 10,614,515 B1 | 4/2020 | Brisson | G06Q 20/3278 |
| 10,661,896 B2 | 5/2020 | Ozaki | B64C 39/02 |
| 10,703,480 B1 | 7/2020 | Thrun | B64C 29/0091 |
| 10,899,473 B2 | 1/2021 | Scherz | H02J 7/0042 |
| 10,953,754 B1 | 3/2021 | Wiegman | B60L 3/12 |
| 10,974,911 B2 | 4/2021 | Zevenbergen | B65G 47/92 |
| 11,048,277 B1 | 6/2021 | Zhu | H04N 5/272 |
| 2005/0137591 A1 | 6/2005 | Barry | A61B 18/1482 606/45 |
| 2009/0098872 A1 | 4/2009 | Deshpande | H04J 11/0093 455/435.2 |
| 2011/0136503 A1* | 6/2011 | Sridhara | H04L 67/52 455/456.1 |
| 2014/0032034 A1 | 1/2014 | Raptopoulos | H04B 7/18506 701/25 |
| 2014/0281698 A1* | 9/2014 | Khorashadi | G09B 29/005 714/15 |
| 2015/0120137 A1 | 4/2015 | Zeng | B62D 15/0265 701/41 |
| 2015/0120138 A1 | 4/2015 | Zeng | G01S 7/4808 701/41 |
| 2015/0142211 A1 | 5/2015 | Shehata | H04W 4/42 701/2 |
| 2015/0365792 A1* | 12/2015 | Manges | H04W 76/14 455/457 |
| 2016/0142211 A1 | 5/2016 | Metke | H04L 63/00 713/175 |
| 2016/0200421 A1 | 7/2016 | Morrison | B64C 13/18 244/17.23 |
| 2017/0064498 A1* | 3/2017 | Manges | G16H 40/20 |
| 2017/0069214 A1 | 3/2017 | Dupray | G08G 5/0013 |
| 2017/0084181 A1 | 3/2017 | Wilson | G08G 5/006 |
| 2017/0148340 A1 | 5/2017 | Popa-Simil | G09B 9/085 |
| 2017/0278405 A1* | 9/2017 | Yakan | G08G 5/0082 |
| 2017/0295458 A1 | 10/2017 | Gao | H04W 64/00 |
| 2017/0323572 A1 | 11/2017 | Chan | G08G 5/045 |
| 2018/0061251 A1* | 3/2018 | Venkatraman | B64U 10/13 |
| 2018/0267562 A1 | 9/2018 | MacCready | G08G 5/0069 |
| 2018/0327091 A1 | 11/2018 | Burks | B64C 39/10 |
| 2019/0329877 A1 | 10/2019 | Benson | B64C 39/024 |
| 2019/0369057 A1 | 12/2019 | Mattar | B64C 39/024 |
| 2020/0225684 A1 | 7/2020 | Anderson | G05D 1/0022 |
| 2020/0301445 A1 | 9/2020 | Jourdan | B64C 39/024 |
| 2021/0163068 A1 | 6/2021 | Zhu | G05D 1/021 |

OTHER PUBLICATIONS

NPL, Lui, Yecheng et al., A virtual-waypoint based artificial potential field method for UAV path planning, 2016 IEEE Chinese Guidance, Navigation and Control Conference (CGNCC)( https://ieeexplore.ieee.org/abstract/document/7828913) (hereinafter "Yecheng").

Lakhmani S, Langelaan JW, Wagner A. Human-intuitable Collision Avoidance for Autonomous and Semi-Autonomous Aerial Vehicles, InAnnual Forum Proceedings—AHS International Jan. 1, 2018 (vol. 2018). American Helicopter Society.

Canadian Intellectual property Office (CIPO), International Search Report and Written Opinion dated Jul. 5, 2019 in respect of PCT Application No. PCT/IB2018/060007.

United States Patent & Trademark Office (USPTO), Final Rejection issued to U.S. Appl. No. 16/603,980, filed Feb. 8, 2022.

United States Patent & Trademark Office (USPTO), Non Final Rejection issued to U.S. Appl. No. 16/603,980, filed Aug. 17, 2021.

* cited by examiner

1001

1008

1009

CONTROL SYSTEM FOR CONTROLLING UNMANNED AUTONOMOUS SYSTEMS

CROSS-REFERENCE TO RELATED APPLICATIONS

This application is a continuation of U.S. patent application Ser. No. 16/603,980 filled Oct. 9, 2019 which is a national phase entry of expired PCT application No. PCT/IB2018/060007 filed Dec. 13, 2018, both entitled: "A CONTROL SYSTEM FOR CONTROLLING UNMANNED AIRCRAFT SYSTEMS". The contents of all of these are hereby incorporated by reference in its entirety.

FIELD OF INVENTION

The embodiment herein generally relates to the field of air traffic control systems. More specifically, the present disclosure provides a control system for controlling unmanned aircraft systems and thereby integrating unmanned aircraft systems into low altitude airspaces.

BACKGROUND AND PRIOR ART

An unmanned aircraft system (UAS), sometimes called a drone, is an aircraft without a human pilot onboard—instead, the UAS is controlled either from an operator on the ground or onboard navigation control systems. There is rapid growth in UAS market and high backlog of commercial operators are seeking permission to use airspace. This rapid growth and high demand to use airspace has created enforcement challenges for government regulators. Some of the major challenges that regulators are facing are in terms of airspace integration, geo-fencing and safety measures. Therefore, in order to overcome said challenges, the UAS has to be controlled and utilized in a better and effective manner.

Conventional approach has limitation rooted in the problem of the state of UAS stack being stuck between the analog and digital age. Full digitalization is inevitable prior to mass beyond visual line of sight adoption. Additionally, there is growing recognition for the need of a centralized data exchange connected through a common protocol (U-space, NASA/FAA UTM). The current approach is to create "smarter" UASs that request and report flight paths to a centralized server, but where the UAS would still be responsible for its own routing and collision avoidance. However, using these protocols may not be efficient when the drone flight density increases. Therefore, there is a need to develop a control system for controlling unmanned aircraft systems that is capable of preventing collision from route conflict with multiple unmanned aircraft operators attempting to utilize the same airspace. Further, there is a need to develop a control system that is capable to function beyond visual line of sight (BVLOS).

OBJECTS OF THE INVENTION

Some of the objects of the present disclosure are described herein below:

A main object of the present disclosure is to provide a control system for controlling unmanned aircraft systems (UAS).

Another object of the present disclosure is to provide a control system capable of preventing collision from route conflict with multiple unmanned aircraft operators attempting to utilize the same airspace.

Still another object of the present disclosure is to provide a control system capable of preventing unauthorized access of UAS into areas without appropriate permission.

Yet another object of the present disclosure is to provide a control system for effectively giving centralized servers the ability to create geofence geographic areas and making available to user(s) all traffic data digitally.

Another object of the present disclosure is to provide a control system that is capable to function beyond visual line of sight (BVLOS).

Another object of the present disclosure is to provide a control system capable of monitoring and setting permission levels for geographic zones.

Another object of the present disclosure is to provide a control system capable to decrease the amount of idling time with multiple unmanned aircrafts using the same airspace by using algorithms to sequence and direct the movements of aircrafts through time division multiplexing.

The other objects and advantages of the present disclosure will be apparent from the following description when read in conjunction with the accompanying drawings, which are incorporated for illustration of preferred embodiments of the present disclosure and are not intended to limit the scope thereof.

SUMMARY OF THE INVENTION

In view of the foregoing, an embodiment herein provides a control system for controlling unmanned aircraft systems (UAS). According to an embodiment, the control system for controlling UAS comprises of creating a layered structure of controls for the controlling of UAS. The primary layers of the system may include an application user layer (can also be referred as application user system) provided at user-end for users to operate the UAS, a virtual roadway system (VRS) and a virtual packet layer [can also be referred as virtual packet] configured to control UASs within the virtual roadway system, and a UAS hardware layer. An operating system can be embedded into the UAS hardware layer to provide the controls for the UAS protocols within the application user layer and virtual packet.

According to an embodiment, the virtual packet can be created as a boundary around the UAS defined by the application user system or the virtual road system (VRS). The operating system may include a machine learning processing unit (MLPU). According to an embodiment, the MLPU can be configured for positioning the UAS within the virtual packet, and detecting and avoiding potential obstructions that enter within the boundary of the virtual packet. The MLPU can be further configured for creating paths within the virtual packet after detecting obstructions and thereby ensuring a stabilized movement of the UAS. The MLPU can be further configured to send actual position co-ordinates to the VRS at regular intervals thereby ensuring that the UAS is at correct position and time intervals.

According to an embodiment, the VRS can be configured to generate a virtual roadway within a centralized server similar to the Internet service provider architecture and modules for routing the UAS within the virtual roadway. The VRS can be further configured to send packet parameters and routing paths to the MLPU, and thereby routing and controlling the UAS. The VRS can receive requests from the application user system to move the UAS from one application zone to another. The VRS can receive application zone packet parameters and actual position co-ordinates from the MLPU.

The MLPU may include an unmanned aircraft positioning system (UAPS), an unmanned aircraft collision detection system (UACDS), and an unmanned aircraft path creation (UAPC). According to an embodiment, the UAPS can be configured to move the UAS from a current position to a target position at a specified velocity while using machine learning neural net algorithms to stabilize against wind and other weather conditions. According to an embodiment, the UACDS can be configured to detect obstructions within the virtual packet and the UAPC can be configured to create the path within the virtual packet that the UAS needs to follow to avoid collisions and obstructions.

The movement of the UAS can be enabled by the application user system through the operating system by passing the UAPS, UACDS, and UAPC functions over to the application user system control. The application user system can allow the user to choose the control of the UAS in various modes within application zones. The modes can include auto collision avoidance mode and manual collision avoidance mode. The auto collision avoidance mode can be configured to automatically avoid collisions and obstructions by using the UACDS and UAPC functions and the manual collision avoidance mode can be configured to manually avoid collisions and use the UAPS function for movement.

According to an embodiment, the Internet service provider architecture and modules of the VRS for the routing of UAS within the virtual roadway can include a virtual local area map (LAM), routing instructions for the UAS that can optimize travel time based on virtual roadway, protocols for communication with the operating system in an application zone, tiering of packet routing modules, Internetworking VRS protocols and a government and other database.

According to an embodiment, the government and regulatory database may include but not limited to user licenses, UAS registration licenses, parameters for UAS class types, parameters for specific application zones and parameters for specific virtual roadway (VR) zones.

The virtual local area map (LAM) can be split into two primary zones, wherein said primary zone can include an application zone (AZ) and a virtual roadway (VR) zone. The control of the UAS within the application zones can be handled by the application layer protocols while the control of the UAS within the virtual roadway can be handled by the VRS layer protocols. The map of virtual roadway zone can be replicated multiple times to create layers of the VRS at different altitudes. According to an embodiment, the VRS routing modules can use the virtual roadway to move the UAS from one AZ to another using Time-Division Multiplexing (TDM) algorithms to handle multiple requests on the virtual roadways. The virtual routing modules can include an UAS packet initialization, a packet path creation (PPC) and a packet routing.

According to an embodiment, the UAS packet initialization module can be configured to set the dimensions of the virtual packet of the UAS and allocate the virtual packet to appropriate VRS layer. Further, the UAS packet initialization module can be configured to pass on source entry point and destination exit point to the PPC module for the creation of the path that the UAS need to take on the virtual roadway.

According to an embodiment, the packet path creation (PPC) module can be configured to compute the shortest path between the source entry point and the destination exit point, wherein the shortest path can be computed using djikstra's algorithm or any one of other routing algorithms (hereinafter referred to as "routing algorithm").

According to an embodiment, the packet routing module can be configured for the routing of the UAS. The target path can be split into discrete segments approximately equal to one packet size and splitting the target path into discrete packet-sized segments can allow the packet routing module to use time-division multiplexing on the VRS for the handling of multiple packets.

Further, the packet routing module can be configured to request a new target path from the PPC and re-route the UAS from a location when a permanent obstruction is blocking the path of the UAS at the location.

According to an embodiment, the protocols for VRS communication with the operating system in the application zone can be configured to ensure the adherence to rules and the regulations that can be set by regulators for each application zone. The protocol can include an application zone packet initialization and a VRS route request.

In an embodiment, the UAS can connect with the VRS databases and to verify that the user and the UAS are appropriately licensed to operate within the application zone. The VRS can send the application zone packet parameters to the MLPU after the verification of the user and UAS. According to an embodiment, the application zone packet parameter can include regulations on application zone packet size and dimensions, minimum and maximum altitude, minimum and maximum velocity and rules on proximity to people, buildings, moving and stationary objects.

In an embodiment, the application user system can request the VRS to move the UAS from a source AZ exit point queue to a destination AZ entry point queue. The application user system can be responsible for bringing the UAS to the appropriate queue before handing off control of the UAS to the VRS. The VRS can send the new packet parameters to the UAS and take control of the UAS via the MLPU functions. Further, the VRS can be configured to release control of the UAS back to the application use system once the UAS has traversed the virtual roadway and exited at the appropriate AZ entry point.

In an embodiment, the tiering of packet routing modules can enable sub-division of the LAM to reduce computational complexity and administrative burden on any single VRS routing mainframe, wherein each division is provided for the routing of the UAS within its own sector and passing the UAS along to neighbouring divisions until the UAS reaches its ultimate destination.

In an embodiment, the Internetworking of VRS protocols can enable the seamless movement of the UAS within the virtual roadway and from one VRS network to another VRS network, wherein the movement of the UAS within the VRS networks, i.e. movement of the UAS from one packet routing network to another routing network is facilitated by VRS network modules. The VRS network modules can include a VRS packet re-initialization module.

According to an embodiment, the VRS packet re-initialization module can be configured to move the UAS packet from one packet routing network to another.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE PREFERRED EMBODIMENTS

Figure 1:
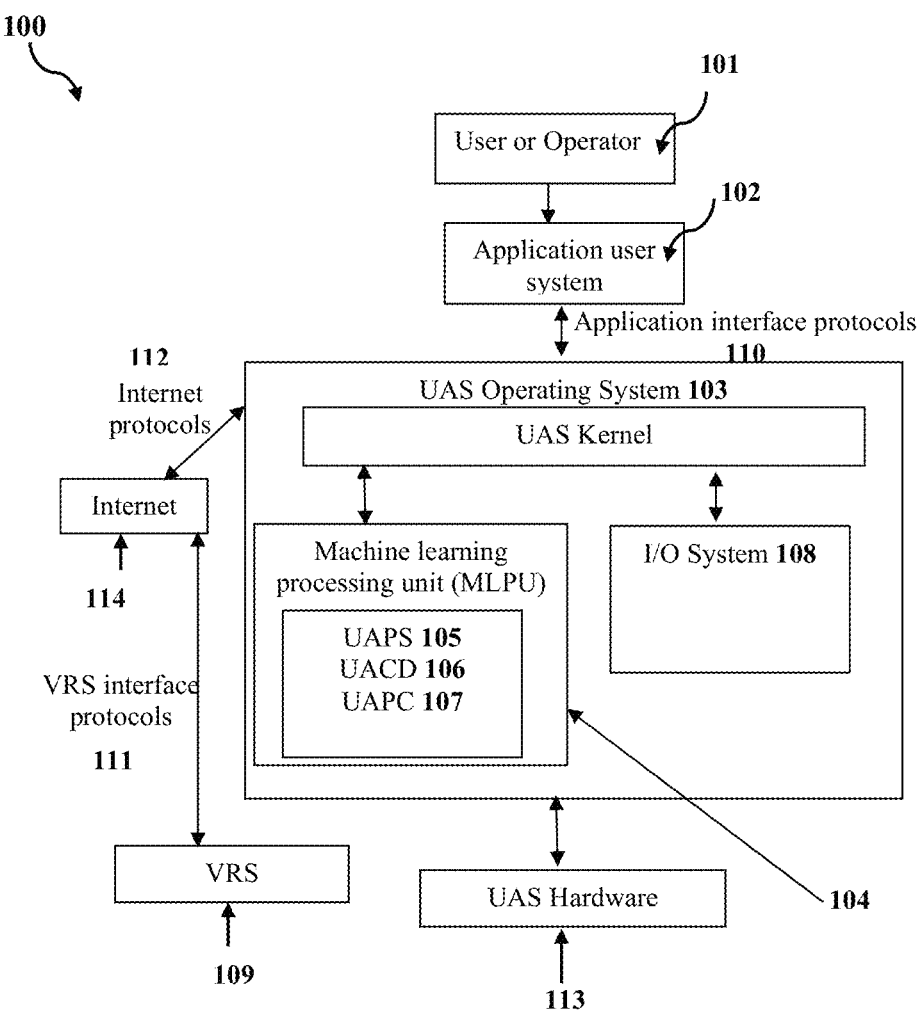
FIG. 1 illustrates a block diagram 100 of a control system for controlling unmanned aircraft systems (UAS), according to an embodiment herein.

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need to develop a control system for controlling unmanned aircraft systems. The embodiments herein achieve this by providing a control system capable of preventing collision from route conflict with multiple unmanned aircraft operators attempting to utilize the same airspace. Referring now to the drawings, and more particularly to FIGS. 1 through 19, where similar reference characters denote corresponding features consistently throughout the figures, there are shown preferred embodiments.

FIG. 1 illustrates a block diagram 100 of control system for controlling unmanned aircraft systems, according to an embodiment. Accordingly, the control system 100 for controlling unmanned aircraft systems (UAS) comprises of an application user system 102 provided at user-end for users 101 to operate the UAS, an operating system 103, a virtual road system 109 and a virtual packet. The operating system 103 can be provided in the UAS.

According to an embodiment, the virtual packet can be created as a boundary around the UAS defined by the application user system 102 or the virtual road system (VRS) 109. According to an embodiment, the operating system 103 can include a machine learning processing unit (MLPU) 104. The operating system (O/S) of the UAS can act as an interface between the application user system to infrastructure system controlled jointly by the government and a public and/or private partners.

According to an embodiment, the MLPU 104 can be configured for positioning the UAS and detecting and avoiding potential obstructions that enters the boundary of the virtual packet. Further, the MLPU 104 can be further configured for creating paths within the virtual packet after detecting obstructions to avoid potential collisions and thereby ensuring a stabilized movement of the UAS. Furthermore, the MLPU 104 can be further configured to send actual position co-ordinates of the VRS at regular intervals thereby ensuring that the UAS is at correct position and time intervals.

According to an embodiment, the VRS 109 can be configured to generate a virtual roadway using a structure similar to the Internet service provider (ISP) architecture and modules for routing the UAS. The VRS 109 can be further configured to send application zone packet parameters to the MLPU 104, and thereby routing and controlling the UAS by the VRS 109 based on request of application user system received from the MLPU 104, application zone packet parameters and actual position co-ordinates received from the MLPU 104. Further, the VRS can be configured to route the UAS physical system through the virtual packet similar to the way an ISP would route a data packet.

The MLPU 104 can include an unmanned aircraft positioning system UAPS 105, an unmanned aircraft collision detection system UACDS 106 and an unmanned aircraft path creation UAPC 107. According to an embodiment, the UAPS 105 can be configured to move the UAS from a current position to a target position at a specified velocity while using machine learning neural net algorithms to stabilize against wind and other weather conditions. According to an embodiment, the UACDS 106 can be configured to detect collisions and obstructions within the virtual packet and the UAPC 107 can be configured to create the path within the virtual packet that the UAS need to follow to avoid collisions and obstructions.

The movement of the UAS can be enabled by the application user system through the operating system by passing the UAPS 105, UACDS 106, and UAPC 107 functions over to the application user system 102 control. The application user system 102 can be configured to allow the user to choose the control of the UAS in various modes. The modes can include but not limited to an auto collision avoidance mode and manual collision avoidance mode. The auto collision avoidance mode can be configured to automatically avoid collisions and obstructions by using the UACDS 106 and UAPC 107 functions and the manual collision avoidance mode can be configured to manually avoid collisions and use the UAPS 105 function for movement.

According to an embodiment, the Internet service provider architecture and modules of the VRS 109 for the routing of UAS within the virtual roadway can include a virtual local area map (LAM), routing instructions for the UAS that can optimize travel time based on the virtual roadway, protocols for communication with the operating system in an application zone, tiering of packet routing modules, Internetworking VRS protocols and government and other databases.

The virtual local area map LAM can be split into two primary zones, wherein the primary zone can include an application zone (AZ) and a virtual roadway (VR) zone. The map of virtual roadway zone can be replicated multiple times to create layers of the VRS at different altitudes. According to an embodiment, the VRS routing modules can use the virtual roadway to move the UAS using Time Division-Multiplexing (TDM) algorithms to handle multiple requests on the virtual roadways. The virtual routing modules can include UAS packet initialization, packet path creation (PPC) and packet routing.

According to an embodiment, the UAS packet initialization module can be configured to set the dimensions of the UAS virtual packet (UVP) and allocate said virtual packet to appropriate VRS layer. Further, the UAS packet initialization module can be configured to pass on source entry point and destination exit point to the PPC module for the creation of the path that the UAS need to take on the virtual roadway.

According to an embodiment, the packet path creation (PPC) module can be configured to compute the shortest path between the source entry point and the destination exit point, wherein the shortest path can be computed using djikstra's algorithm or other similar routing algorithms (hereinafter referred to as "Routing Algorithms").

According to an embodiment, the packet routing module can be configured for the routing of the UVP. The target path can be split into discrete segments approximately equal to one packet size and splitting the target path into discrete packet-sized segments can allow the packet routing module to use TDM on the VRS for the handling of multiple packets. Further, the packet routing module can be configured to request a new target path from the PPC and re-route the UVP from a location when a permanent obstruction is blocking the path of the UVP at the location.

According to an embodiment, the protocols for VRS communication with the operating system in the application zone can be configured to ensure the adherence to rules and the regulations for each application zone. The protocol can include an application zone packet initialization and a VRS route request.

In an embodiment, the UAS can connect with the VRS and to verify that the user and the UAS are appropriately licensed to operate within the application zone. The VRS can send the application zone packet parameters to MLPU after the verification of the user and UAS. According to an embodiment, the application zone packet parameter can include but not limited to an application zone packet size and dimensions, maximum height, maximum velocity and rules on proximity to people, buildings, moving and stationary objects along with any other rules to ensure the safe use of the UAS.

In an embodiment, the application user system can request the VRS to move the UAS from a source AZ exit point queue to a destination AZ entry point queue. Further, the application user system can be configured to bring the UAS to the appropriate queue before handing off control of the UAS to the VRS and thereby sending the new packet parameters by the VRS to the MLPU and taking control of the UAS by the VRS. Furthermore, the VRS can be further configured to release control of the UAS back to the application use system once the UAS has traversed the virtual roadway and exited at the appropriate AZ entry point.

In an embodiment, the tiering of packet routing modules can enable sub-division of packet routing modules to reduce computational complexity and administrative burden on any single VRS routing network, wherein each division can be provided for the routing of the UAS within its own sector and passing the UAS along to neighbouring divisions until the UAS reaches its ultimate destination.

In an embodiment, the Internetworking of VRS protocols can enable the movement of the UAS within the virtual roadway and from one VRS network to another VRS network, wherein the movement of the UAS within the VRS networks requires modules. The module can include a VRS packet re-initialization.

According to an embodiment, the VRS packet re-initialization module can be configured to move the UAS packet from one packet routing network to another. According to an embodiment, the government and regulatory database can include but not limited to user licenses, UAS registration licenses, parameters for UAS class types, parameters for specific application zones and parameters for specific VR zones.

Figure 2:
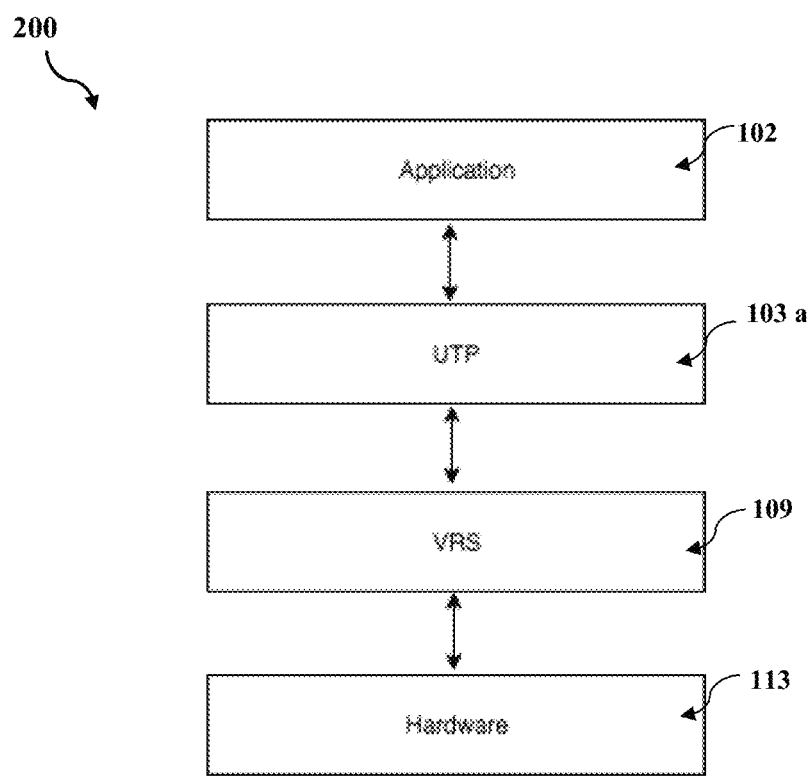
FIG. 2 illustrates a diagrammatic representation 200 of layers of the control system for controlling the UAS, according to an embodiment herein

FIG. 2 illustrates a diagrammatic representation 200 of layers of the control system for controlling the UAS, according to an embodiment. The layers of the control system can include an application layer 102, a UAS transport protocol layer (UTP) 103 a, a VRS layer 109 and a hardware layer 113. The application layer 102 can include application programs that can allow the user to interface with the UAS. The UTP layer 103a can be the set of protocols configured to create the virtual packet and collision detection/avoidance (handled by the UAS O/S). The VRS layer 105 can act as centralized servers that can be configured to route the virtual packets from source to destination. The hardware layer 109 is the actual UAS hardware system.

Figure 3:
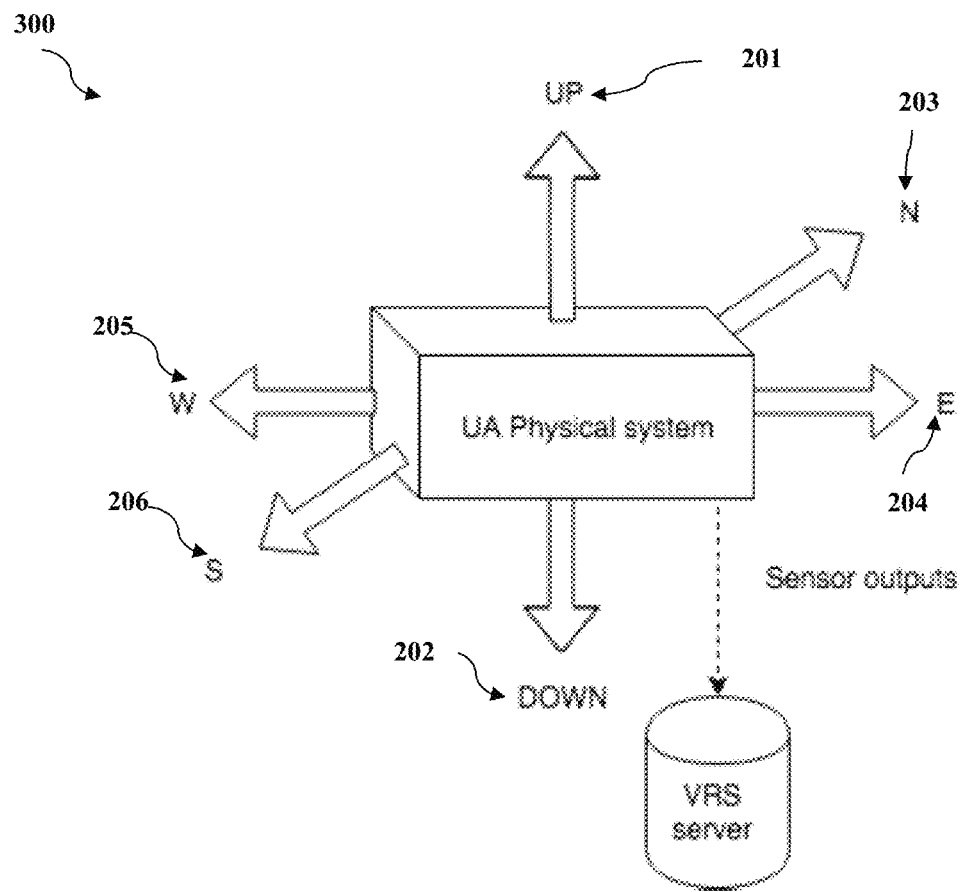
FIG. 3 illustrates a diagrammatic representation 300 six degrees of freedom for the control of the UAS movement, according to an embodiment herein.

FIG. 3 illustrates a pictorial representation 300 of six degrees of freedom for the control of the UAS movement, according to an embodiment. Accordingly, the MLPU 104 can further include an input output system (I/O) system 108. The I/O System 108 can be provided to handle the inputs and outputs of the UAS system and pass said outputs to appropriate modules. The inputs can be received from but not limited to GPS location sensor, altitude sensor, wind sensor, precipitation sensor and obstruction sensor. The GPS location sensor can be provided to indicate geo-location of UAS relative to the planned route from the application user system 102 or VRS 109. The altitude sensor can be provided to determine level of the VRS 109 that the UAS is currently being routed in. The wind sensor can be provided to assist MLPU 104 with algorithm for the UAS positioning (UAPS) 105. The precipitation sensor can be provided to assist MLPU 104 with algorithm for the UA positioning system (UAPS) 105. The obstruction detection sensor (i.e. 360 degree camera or laser sensor) can be provided for the MLPU 104 algorithm to assist with UA collision detection system (UACDS).

In an embodiment, the outputs for the UAS physical system can indicate the six degrees of freedom for the control of the UAS movement. The movement of the UAS can be controlled by the MLPU. The six degrees of freedom of movement is in the direction of up 201, down 202, north 203, east 204, west 205 and south 206. The other output can include wind and precipitation sensor outputs for VRS and collision detection outputs for VRS.

Figure 4A:
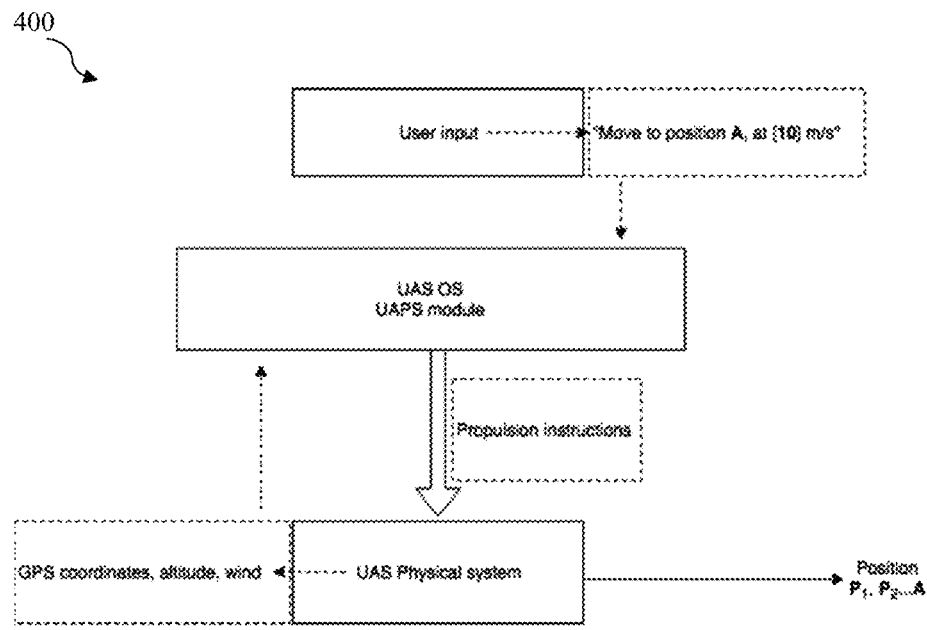
FIG. 4A illustrates a pictorial representation 400 of unmanned aircraft positioning system (UAPS), according to an embodiment herein.

FIG. 4A illustrates a pictorial representation 400 of unmanned aircraft positioning system (UAPS), according to an embodiment. The UAPS 105 can move the UAS from current position to a target position at a specified velocity while using machine learning neural net algorithms to stabilize itself against wind and other weather conditions. For example, the user provides the input move to position A, at 10 m/s. The UAPS 105 can move the UAS from the current position to the position A at 10 m/s velocity while using machine learning algorithms to stabilize itself against wind and other weather conditions.

Figure 4B:
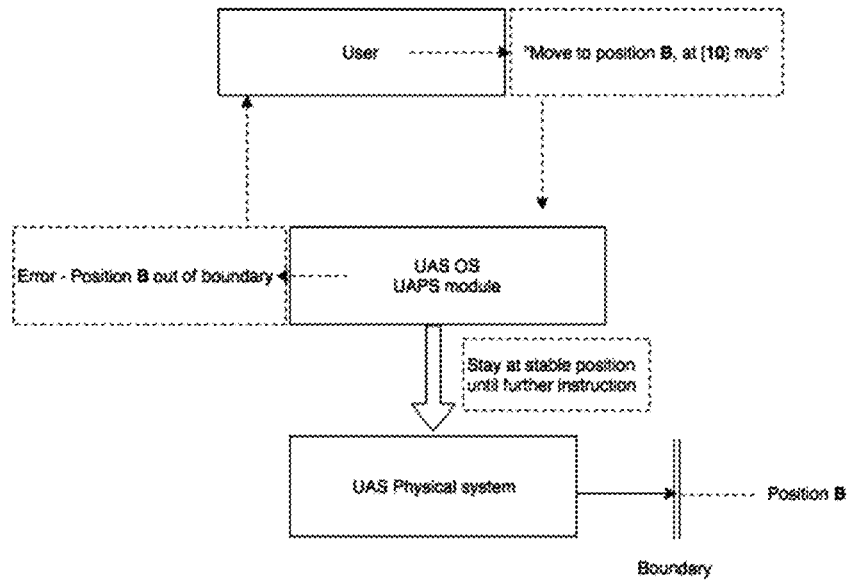
FIG. 4B illustrates a pictorial representation of unmanned aircraft positioning system (UAPS) showing the capability of UAPS to ignore instructions from the application/user, according to an embodiment herein.

FIG. 4B illustrates a pictorial representation of unmanned aircraft positioning system (UAPS) showing the capability of UAPS to ignore instructions from the application/user, according to an embodiment. A useful functionality that arises from using UAPS 105 as an interface between the application/user controls from and the actual UAS physical system is that the UAPS 105 can chose to ignore instructions from the application/user. The UAPS function can allow the operating system to create restricted areas or boundaries that the application/user is unable to penetrate. The UAPS functionality is used in conjunction with protocols to create the geo-fencing areas within the VRS. For example, when the user provides input "move to position B, at 10 m/s. The UAPS cannot move the UAS to position B because the position B is out of boundary. Therefore, the UAS stays at stable position until further input or instruction is received.

Figure 5A:
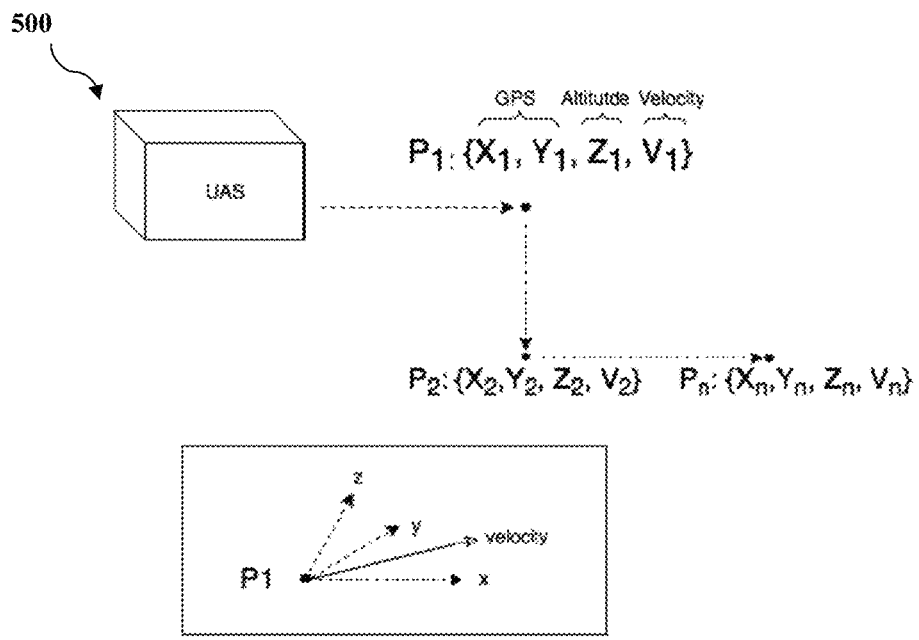
FIG. 5A illustrates a pictorial representation 500 of position co-ordinates of the UAS, according to an embodiment herein.

FIG. 5A illustrates a pictorial representation 500 of position co-ordinates of the UAS, according to an embodiment. A pathway for the UAS is created by passing on a set of coordinates $P_1, P_2, \ldots P_N$ such that elements in P can include the x, y positioning as per GPS coordinates, its z positioning from the altitude sensor and the required velocity that the UAS should travel at. The relative distance between points (i.e. P1 to P2) can be kept short to ensure that the feedback cycle between the application user system 102/VRS 109 and the UAPS 105 is small. The machine learning neural net algorithm can be used to ensure that the UAS can travel to its intended destination in a stable manner. For inputs, the UAPS neural network (UAPSNN) can receive its x, y coordinates which corresponds to its GPS coordinates, its z positioning which corresponds to its altitude and velocity. The wind and precipitation sensors are used by the UAPSNN to assist with its learning rate. The outputs for the UAPSNN can be made to control the UAS propulsion so that that UAS can travel along its set path in a stable manner. The position points $P_1, P_2, \ldots P_N$ can be received from the user and the UAPSNN can endeavor to follow the received set of path points.

Figure 5B:
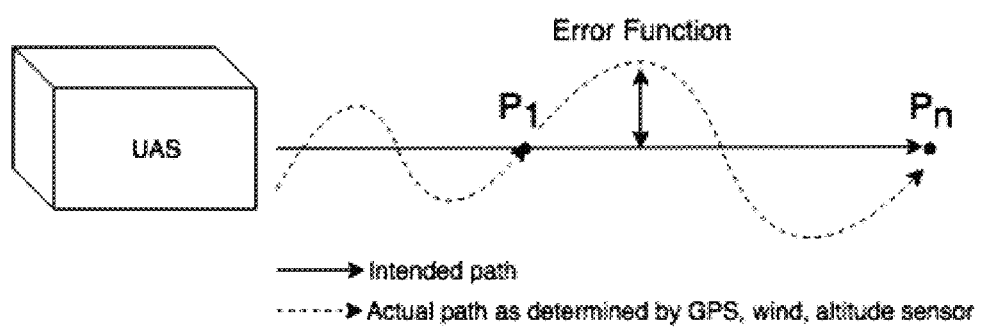
FIG. 5B illustrates an error function for the UAPS, according to an embodiment herein.

FIG. 5B illustrates an error function for the UAPS, according to an embodiment. The Error function (as defined for machine learning neural nets) for the UAPSNN may be the distance between the intended path and the actual path of the UAS.

Error function ($E_n$), $$E_n = \sqrt{(X_n-X_0)^2+(Y_n-Y_0)^2+(Z_n-Z_0)^2+(V_n-V_0)^2}$$

The UAPSNN can optimize the path taken by the UAS by minimizing the error function $E_n$=distance between $P_n$ (target position) to $P_o$ (actual position at time N).

Figure 6A:
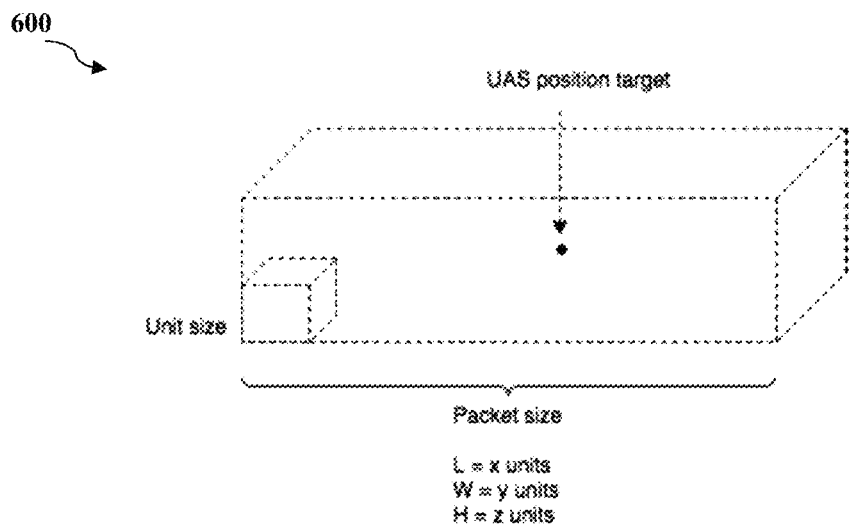
FIG. 6A illustrates a pictorial representation 600 of size of virtual packet of the UAS, according to an embodiment herein.

FIG. 6A illustrates a pictorial representation 600 of size of virtual packet of the UAS, according to an embodiment. The UACDS 106 can use the collision detection sensor feed to flag potential objects as obstacles within its packet. The size of the area that the UACDS 106 check against can be determined by packet size received from the VRS 109 or application protocols. Identified objects can be classified into stationary and mobile and reported back to VRS 109 and/or application user system 102 through their respective protocols.

Figure 6B:
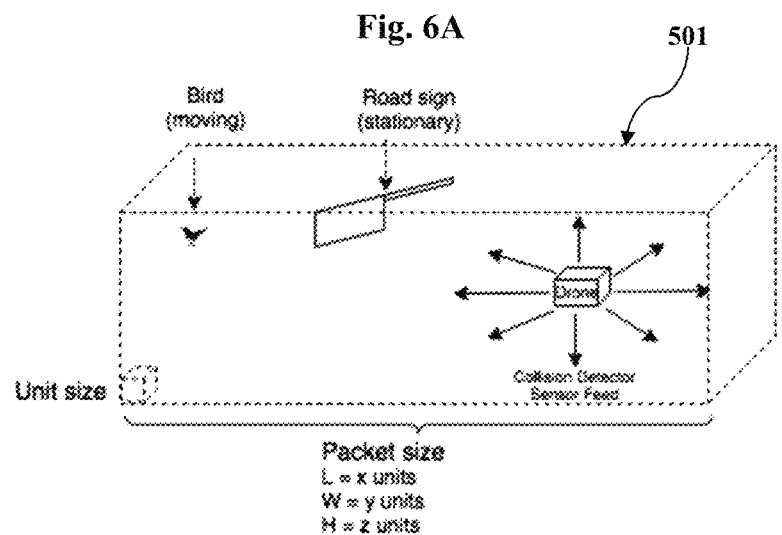
FIG. 6B illustrates a pictorial representation of UACDS, according to an embodiment herein.

FIG. 6B illustrates a pictorial representation of UACDS, according to an embodiment. The UACDS 106 can detect and classify any obstructions that are within the virtual packet (also referred as packet) boundary. A report of identified objects may be sent to the UA path creation (UAPC) 107 model to assist with setting of the path through the virtual packet.

Figure 7A:
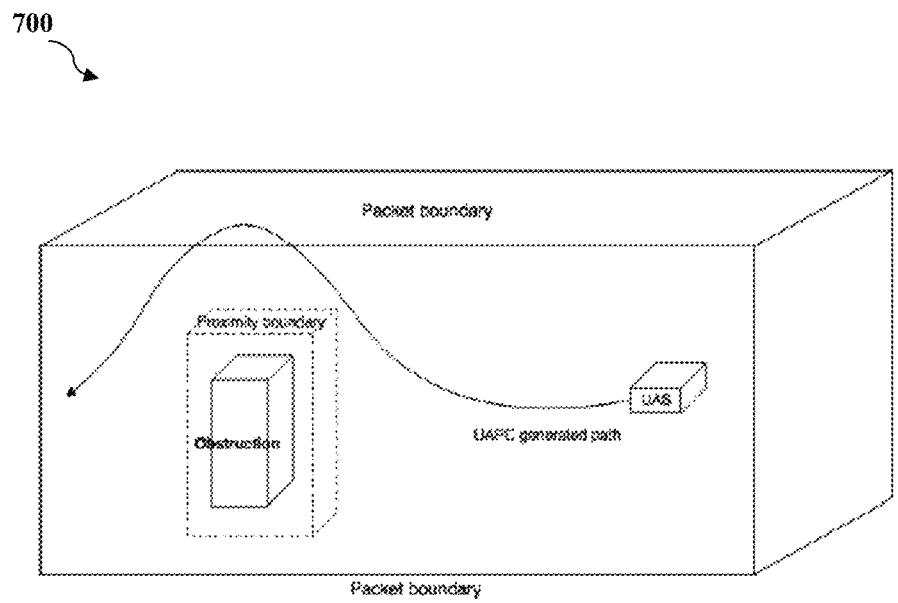
FIG. 7A illustrates a pictorial representation 700 of UAPC showing path generated by the UAPC, according to an embodiment herein.

FIG. 7A illustrates a pictorial representation 700 of UAPC showing path generated by the UAPC, according to an embodiment. The UAPC 107 module can create pathways within the packet for the UAPS 105 to follow while avoiding potential obstructions. As long as there are no obstructions to the path reported by the UACDS 106, the UAPC 107 can feed the UAS position target directly to the UAPS 105 (i.e. if there is no need to deviate from the target position point, the instruction would be to maintain the target position or move along the target path). The UAPC 107 can receive object obstruction positions for the UACDS 106 and determine alternative pathways within the packet to avoid collisions.

Figure 7B:
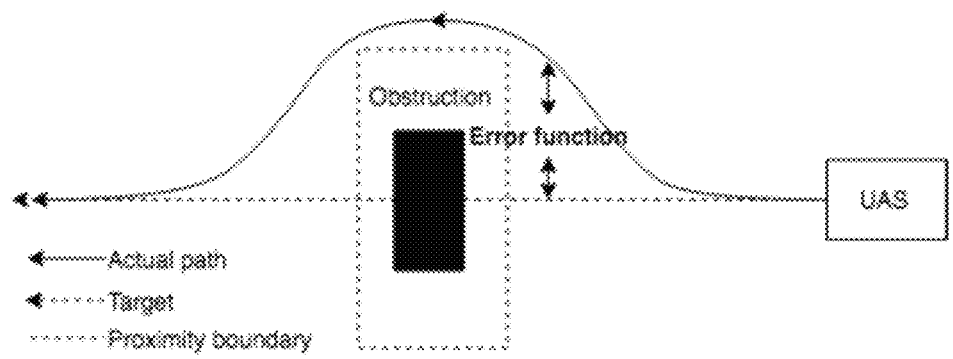
FIG. 7B illustrates an error function for the UAPC, according to an embodiment herein.

FIG. 7B illustrates an error function for the UAPC, according to an embodiment. The UAPC 107 can ensure to keep the path as close to the target position/path as possible and calculate the error function for the MLPU 104 to be the path deviation from the target position.

Error function $E_n=$ $$E_n = \sqrt{(X_n-X_T)^2+(Y_n-Y_T)^2+(Z_n-Z_T)^2+(V_n-V_T)^2}$$

In an embodiment, the UAPC 107 can be configured to handle two different categories of obstructions. The category can include stationary and moving. The stationary obstructions can be relatively easy to handle since they are immobile and the task of the UAPC 107 may to simply avoid the object so that a collision can be avoided. The position of the stationary object can be indicated within the packet by the UACDS 106. There is also a proximity boundary which the UAPC 107 endeavors to avoid. In the case that the UAS falls within the proximity bounds of the obstruction, the UAS need to slow its velocity and move away from the obstruction until it is outside of the proximity bounds. In most cases, the UAPC 107 may not allow to move into the proximity boundary of an obstruction but it is pushed into it from unforeseen circumstances (i.e. strong winds).

Moving obstructions can be harder to handle than stationary obstructions. The quicker the object the proximity boundary around can increase at a proportional rate (either linear or no-linear) to the direction of motion. The size of proximity boundary may be dependent on velocity of object. If an object is obstructing the UAS from continuing on the path received from the VRS 109, the UAS can come to a stop and send a report to the VRS 109 through the VRS protocols and then the UAS can be rerouted by the VRS 109. The obstruction can be the boundary of another UAS packet that could be the obstruction (i.e. there is a UAS packet that has come to a stop in front of the UAS). If no object is obstructing its path, the path sequence may send to the UAPS 105 as the input path for the module.

Figure 8:
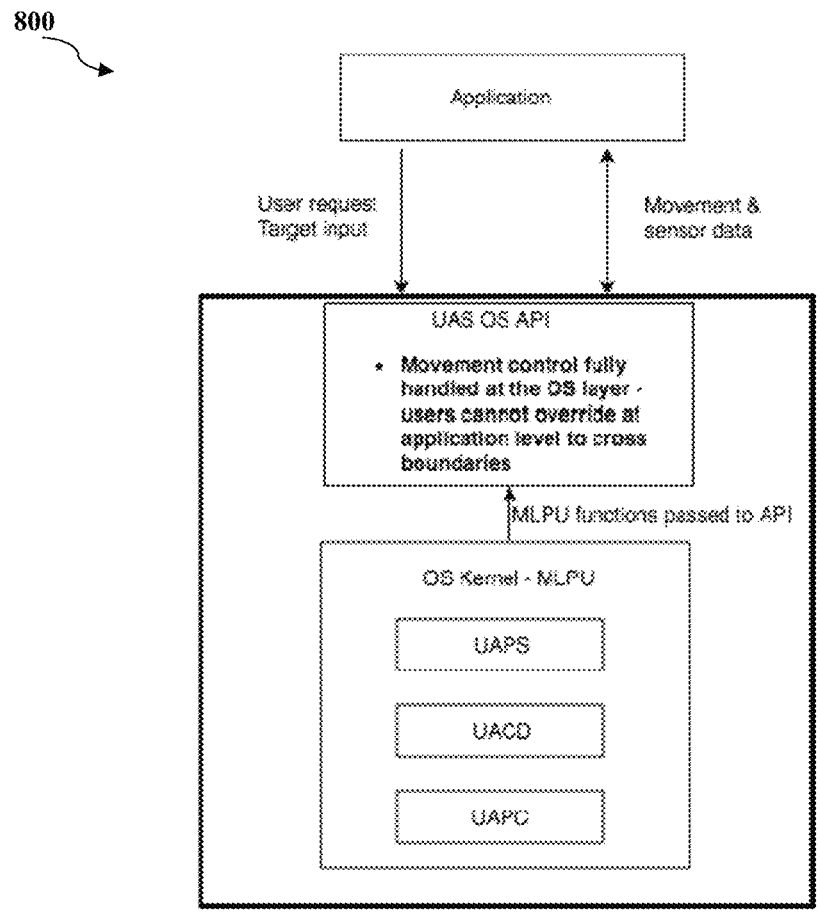
FIG. 8 illustrates a pictorial representation 800 showing communication between application user system and operating system, according to an embodiment herein.

FIG. 8 illustrates a pictorial representation 800 showing communication between application user system and operating system, according to an embodiment. The control system can further include Internet connectivity 114 (also referred as Internet), application interface protocols 110, Internet protocols 112 and VRS interface protocols 111. The UAS may require standard Internet connectivity 114 via mobile wireless networks to operate. The UAS may not fly into the area if there is no wireless connectivity. When the Internet connectivity is lost while in the VRS 109 network the UAS may initiate safety protocols for staying stationary until Internet connectivity 114 is restored. The UAS can perform a slow drop to the ground while emitting hazard lights and sounds when battery power drops below the required level to complete its task.

In an embodiment, the operating system 103 may be responsible and capable to handle the protocols to interact with the application user systems. According to an embodiment, the application interface protocols 110 may include connection between the application user system 102 and the operating system 103, movement instructions from application user system 102 to the operating system 103, sensor data from OS 103 to application user system 102 and request to enter/exit VRS at government authorized entry points. The connection between the application user system 102 and the operating system 103 can include verification against government databases that the UAS and the driver/operator have appropriate licenses and insurance.

In an embodiment, the application user system 102 can find the operating system 103 via its IP address on a Domain Name Server (DNS) and connects to the operating system 103 via protocols similar to HTML. The connection protocol can include a check against government databases for connection to VRS 109 system through handshake protocols, initial verification that the UAS is in a specified application zone and VRS 109 to check credentials against multiple government databases.

In an embodiment, the VRS 109 can check credentials against multiple government databases, check UAS has license and has been verified to meet all required regulations for safety regulations of the application zone, check whether the UAS pilot is licensed to fly the UAS in the application zone, check whether the UAS must fly only in the application zones and cannot enter the VRS 109 or restricted areas without proper clearances.

In an embodiment, the movement of the UAS by the application user system 102 can be enabled through the O/S 103 by passing the UAPS 105, UACDS 106, and UAPC 107 functions over to application user system 102 controls. Since these functions passed by the O/S 103, the O/S 103 can be used to prevent the UAS from entering restricted airspaces or geo-fenced zones. Since the application user system 102 must use the UAPS 105, UACDS 106 and UAPC 107 functions to control the UAS, the application user system 102 can be prevented from moving the UAS outside of specified application zones without proper permissions.

In an embodiment, the operating system 103 can pass all or a subset of the sensor data to the application user system for it to track the movement of position of the UAS. The O/S 103 can able to handle the protocols to pass control of the UAS from the application user system to the VRS 109 and vice versa. The VRS interface protocols can include request permission to enter VRS 109 to connect with another application zone and VRS control of UAS Virtual Packets (UVP). Entry 801 and Exit points 802 are pre-authorized areas to enter and exit the VRS. At these points, the application software (application user system) can hand off control of the UAS to the VRS.

Figure 9:
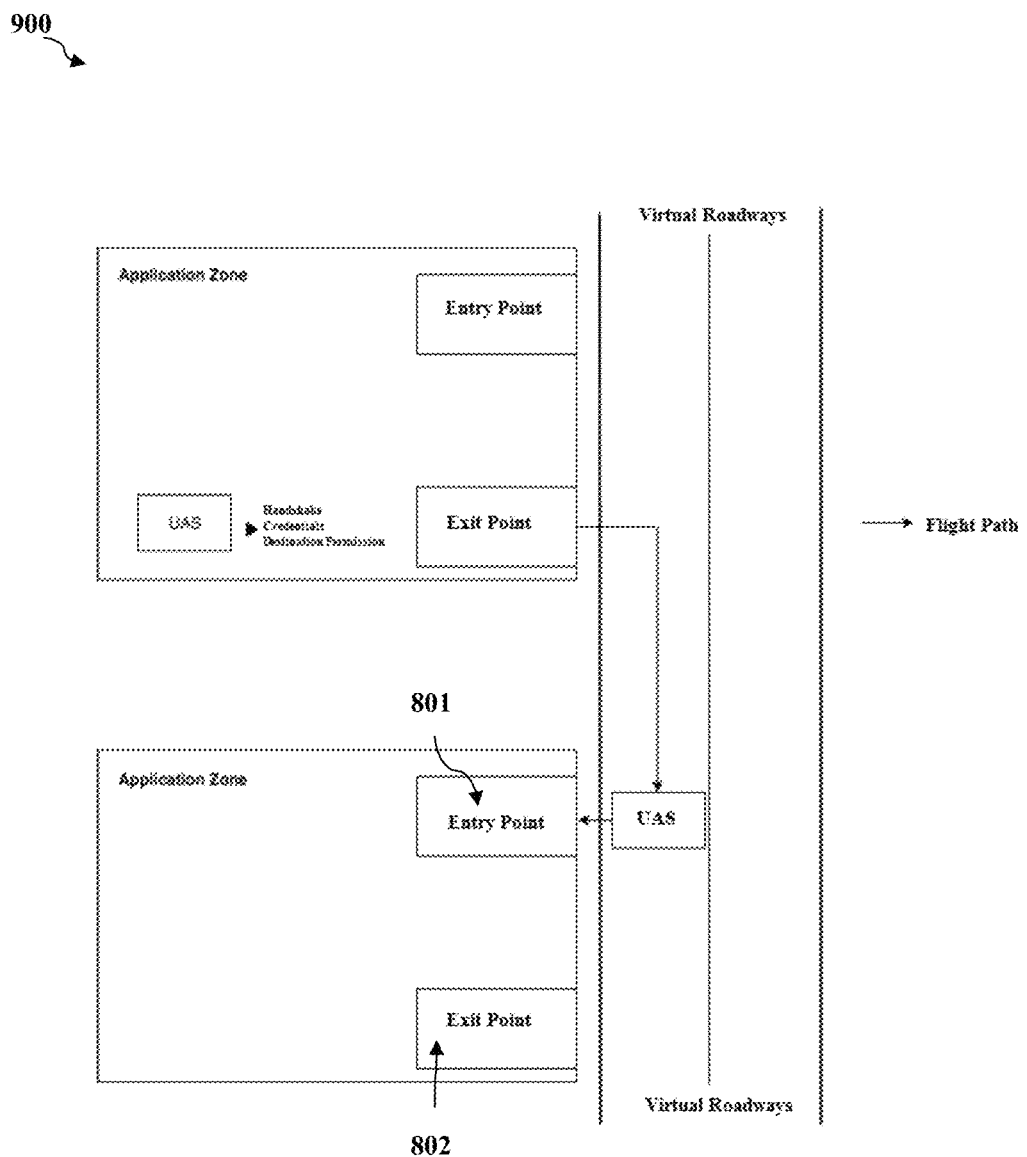
FIG. 9 illustrates a pictorial representation 900 showing connection of the UAS with virtual road system (VRS), according to an embodiment herein.

FIG. 9 illustrates a pictorial representation 900 showing connection of the UAS with virtual road system (VRS), according to an embodiment. In an embodiment, a method for connecting the UAS with the VRS 109 comprising the steps of connecting with VRS 109 through handshake protocols, submitting pilot credentials along with license of UAS to VRS 109, checking credentials and licenses of UAS and pilot with online database by the VRS 109, checking online database by the VRS 109 to ensure that the UAS and pilot have the credentials to access the destination AZ, queuing the UAS to enter the VRS 109 at the source AZ exit point after verification (checking), and routing the UAS to destination AZ entry point thereby passing the UAS control back to the application user system control through handshake protocols.

In an embodiment, the VRS can be configured for routing the UVP from the source AZ to the destination AZ in an optimal path. Within the UVP, the MLPU 104 in the UAS O/S 103 may responsible for the detection and avoidance of potential obstruction, leaving the VRS 109 free to abstract away the UAS and view it as a UVP. This "Packetization" of the UAS allows for the decentralization of the computationally intensive MLPU 104 algorithms down to the UAS O/S 103 level. While under VRS 109 control, obstructions that are impeding but not blocking the UAS packet are bypassed through the MLPU 104 and UAPC 107 module. If an obstruction is persistent, it can be flagged for further investigation. If an obstruction is blocking the route of the UAS packet so that it cannot progress through its route, the VRS 109 can re-route the UAS to the next optimal route.

Figure 10:
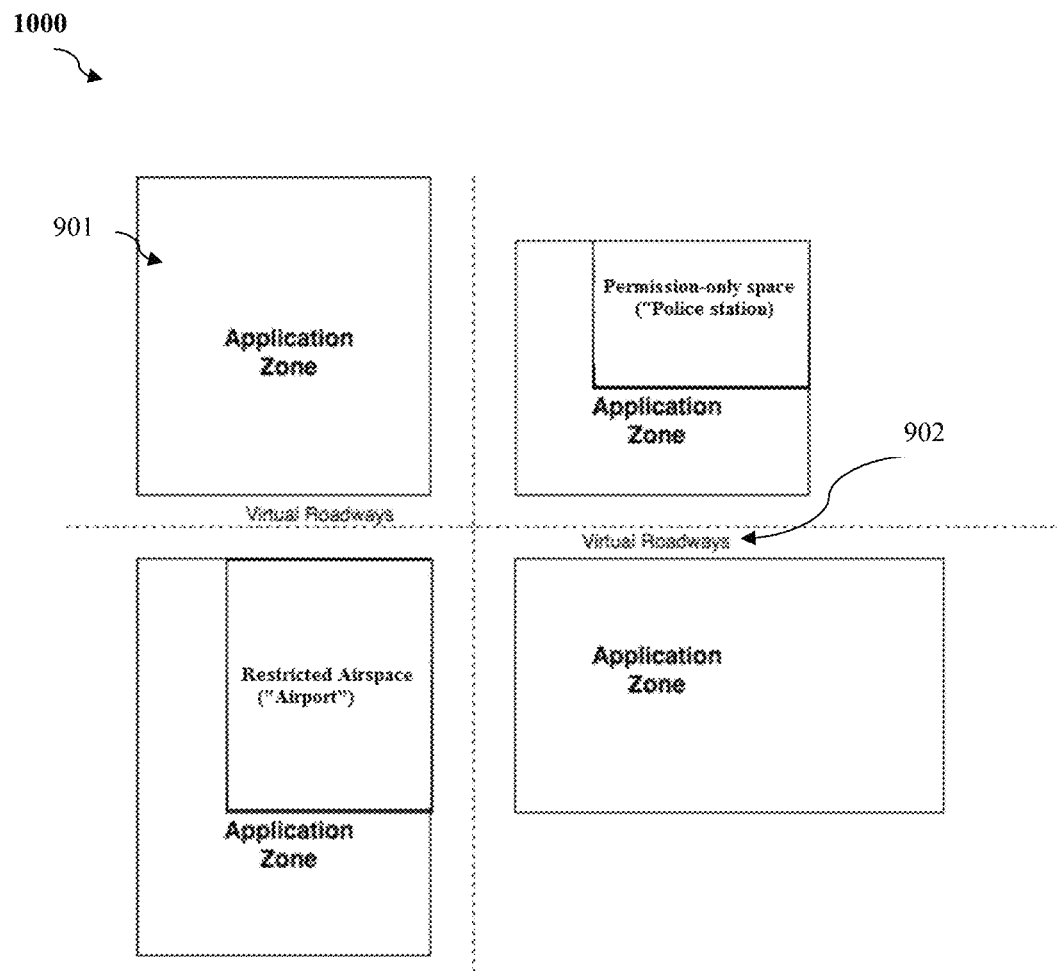
FIG. 10 illustrates a pictorial representation 1000 of a virtual local area map, according to an embodiment herein.

FIG. 10 illustrates a pictorial representation 1000 of a virtual local area map, according to an embodiment. The VRS 109 is a virtualized roadway created to support the movement of a UAS from one application zone to another. The virtual roadways can be over-layed at various altitudes over current city roadways systems. The VRS 109 can ensure that there are minimal buildings or obstructions that could block or impede the virtual roadway. The VRS 109 can also allow the virtual roadways to build their architecture on top of the GPS technology and take advantage of all the work that has been done in the field of GPS mapping. The VRS 109 can include high level modules and Internet service providers configured to generate virtual roadway for routing of UAS within the VRS infrastructure 109.

According to an embodiment, the VRS 109 modules can include a virtual LAM of application zones and VR zones 109, routing instructions for the UVP that can optimize travel time based on virtual road conditions, protocols for communication with the O/S 103 in an application zone 901, tiering of Packet Routing Modules, Internetworking of VRS Protocols and a government and other database.

The virtual LAM can be split into application zone 901 and virtual roadways 902. Each zone can include rules and regulations that can be enforced by the operating system of the UAS. The rules and regulations can be designed with input from the government UAS regulatory arm. The creation of a standardized O/S and a LAM of application zones can facilitate the enforcement and regulation of visual line of sight (VLOS) of UASs. The creation of the VRS 109 can facilitate the enforcement and regulations on both VLOS and BVLOS (beyond visual line of sight) UASs.

According to an embodiment, the application zone 901 can be classified as Type A, B, etc. in a similar way that the government policy makers currently classify the various urban and rural zones. The operating system can be made to enforce the defined rules and regulations on the UAS pilots and reduce administrative burden on law enforcement. To access the UAS, the pilot would be required to submit respective pilot license number which is checked against the online government database. The government database can also check to see if the UAS has a proper license plate and insurance. Different classes of licenses can be issued for different training levels for the pilot. The license types can dictate their maximum speed and proximity boundaries to potential obstacles. The speed limit within application zones 901 can be enforced on the application software (application user system) since the O/S has direct access to control the UAS. The speed limit for any application can be applied in the UAPS.

Figure 11:
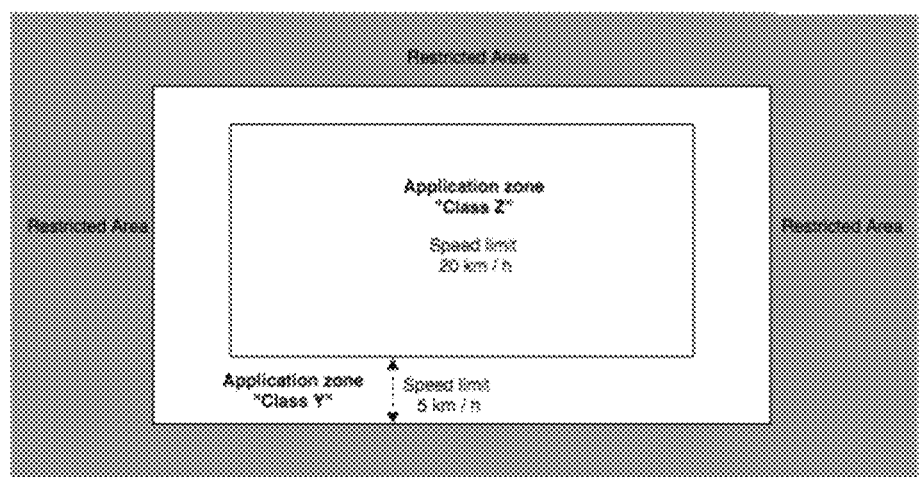
FIG. 11 illustrates a pictorial representation 1001 of application zone boundaries and an example of potential altitude limits, according to an embodiment herein.
Figure 11:
Figure 11:
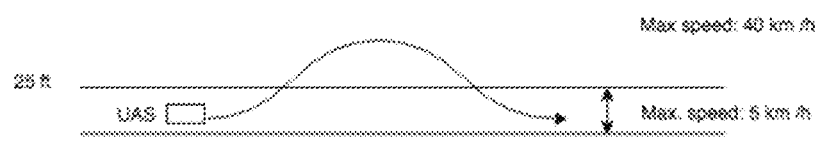

FIG. 11 illustrates a pictorial representation 1001 of application zone boundaries and an example of potential altitude limits, according to an embodiment. Application zone boundaries can be applied using the UAPS function and setting the bounds outside of the AZ 901 as a restricted zone. Altitude limits can also be set by setting the specified thresholds as a restricted zone or setting lower speed limits at various altitudes. The proximity boundary to people can be enforced by the O/S 103 by setting a safety multiple of the minimum safe distance to people within the boundary of the packet size in the UACDS 106 module. Any objects identified as a person by the sensor algorithm in the MLPU 104 have a proximity boundary that progressively decreases the maximum speed around the person. The proximity boundary around buildings and other stationary objects can be enforced in the same way as the proximity to people, but the minimum safe distance can be made smaller since safety may be less of an issue. The VLOS can be maintained between the pilot and the UAS using the VLOS sensors.

If VLOS is lost, the UAS can be made to hover in place until VLOS is regained with the pilot. While hovering in place, the UACDS 106 and UAPC 107 function can allow the UAS to automatically avoid in-coming flying objects. The O/S 103 can be made to monitoring power levels and after it reaches certain critical levels, issue warnings to the pilot via the application user system API. If the UAS is at risk of falling out of power completely, the O/S 103 can able to initiating a slow drop with hazard lights flashing. If the O/S 103 detects that the UAS is not performing to prescribe standards due to damage or poor calibration, the O/S 103 can able to attempting a slow drop with hazard lights and lock out users from starting the system up until the issue has been rectified.

Figure 12:
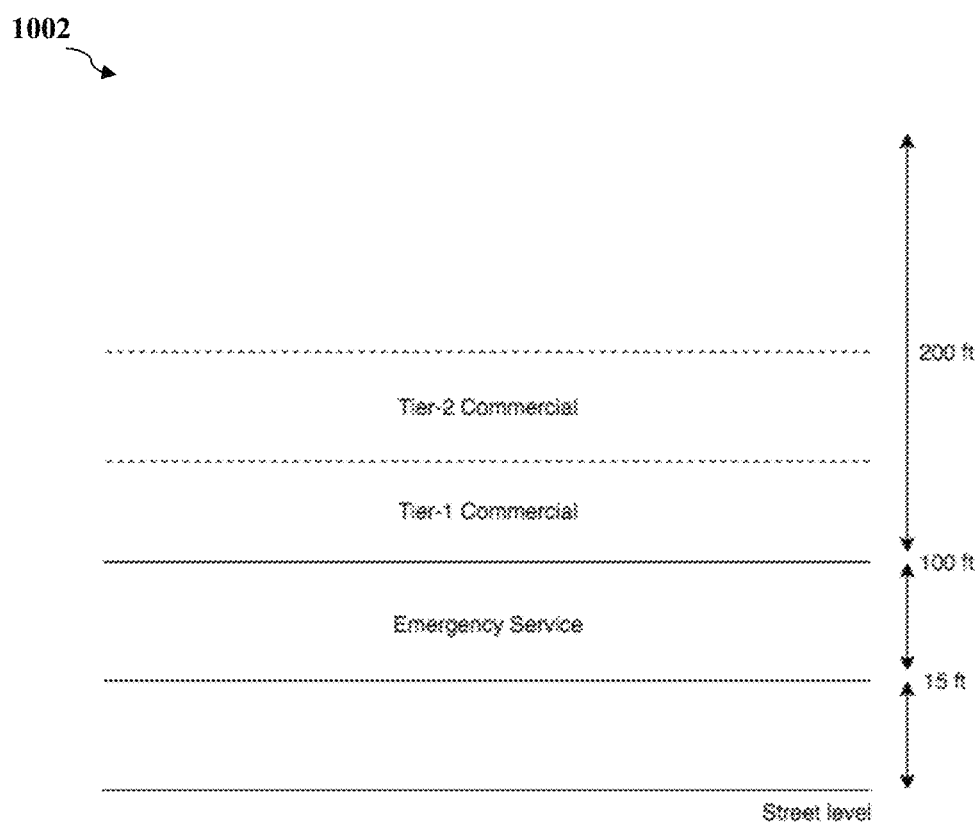
FIG. 12 illustrates a pictorial representation 1002 of tiering of virtual roadway architecture via altitudes, according to an embodiment herein.

FIG. 12 illustrates a pictorial representation 1002 of tiering of virtual roadway architecture via altitudes, according to an embodiment. Different altitudes can be allocated to UAS segments similar to the way different bands of wavelength are currently allocated to ISPs. The Virtual Roadway Map (VRM) can form the roadway to transport the UAS from one application zone to another. The framework of the VRM can overlay with the current roadway system within a city. The LAM can include the VRM and all of the application zones within the city. Parts or all of the city roadway system can be used to create the backbone of the VRS network. The creation of the VRM can tap into the work done on currently existing GPS mapping technology to create a 2-dimensional map of a city region. The 2-dimensional map can be replicated multiple times to create the layers of the VRS 109 at different altitudes. The VRS can be layered with emergency/priority VRs at the lower altitude layers and tiered commercial layers at the higher altitudes. The lower layers can be assigned to emergency/priority UASs so that the time required to climb to the correct altitude of the VR can be minimized. The upper layers can be used for commercial and/or consumer UASs.

Figure 13:
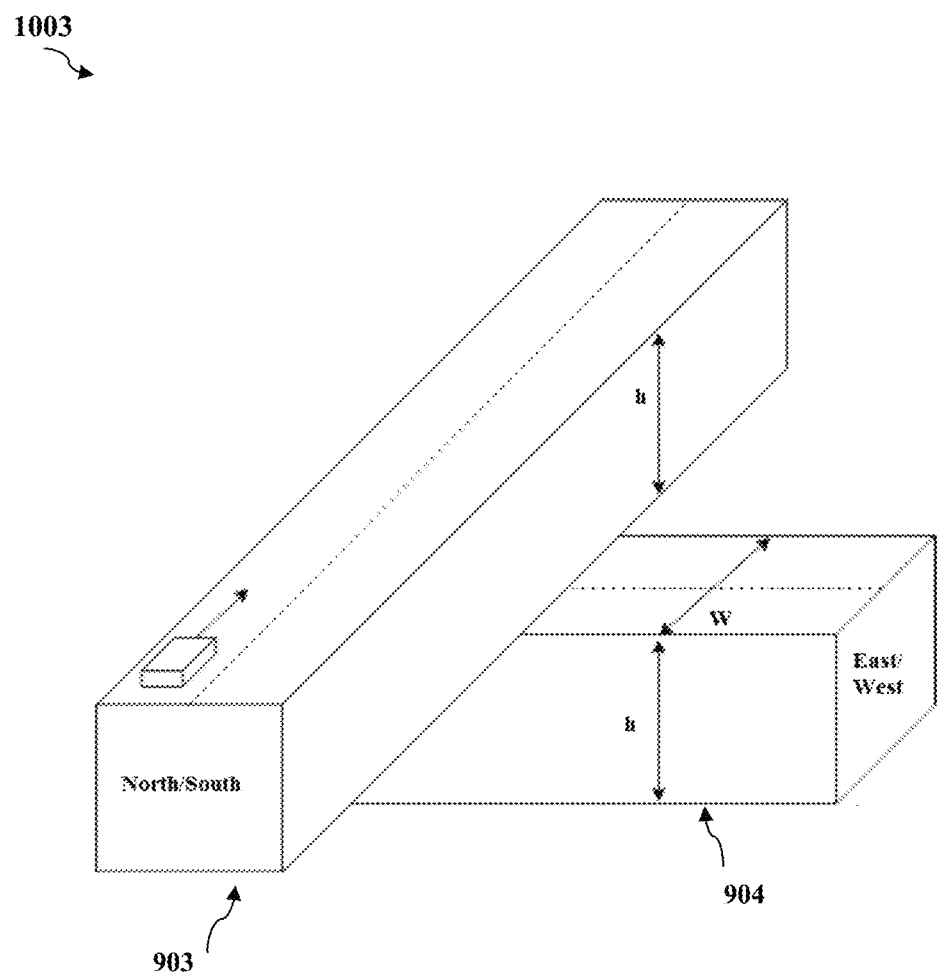
FIG. 13 illustrates a pictorial representation 1003 of a virtual roadway architecture within layers to subdivide the flow of traffic (i.e. north/south vs east/west), according to an embodiment herein.

FIG. 13 illustrates a pictorial representation 1003 of a virtual roadway architecture within layers to subdivide the flow of traffic (i.e. north/south vs east/west), according to an embodiment. Each layer of the VR can have a height of at least 2×h, where h is the height of a packet, to create 2 sub layers within each layer. ie, north/south orientation sub-layer 903 and east/west orientation sub-layer 904. The north/south 903 and east/west sub-layers 904 may be at different altitudes so that traffic move freely in four directions. Unused airspace can be utilized to merge between the sub-layers, (i.e. the N/S sub-layer can use the airspace at the E/W sub-layer altitude and vice versa to merge at roadway intersections).

To simplify merging, merging can be made possible in only one direction (i.e. the UAS can only make "right turns"). Each N/S sub-layer 903 and the E/W sub-layers 904 can be further sub-divided vertically to create multiple lanes which can be used to route UAS traffic at varying speed limits. The speed limits can be increases as you move further away from the N/S 903 and E/W 904 merging lanes. Having multiple lanes can allow the routing algorithms to route traffic for UASs that have varying speed limit capabilities. Each VR corridor can be made to handle as many lanes as the roads will allow width-wise. The initial packet width can set to be approximately equal to the width of a road lane to ensure that the UAS has sufficient space within the packet to maneuver and stabilize itself under wind and environmental conditions and avoid obstructions.

Figure 14:
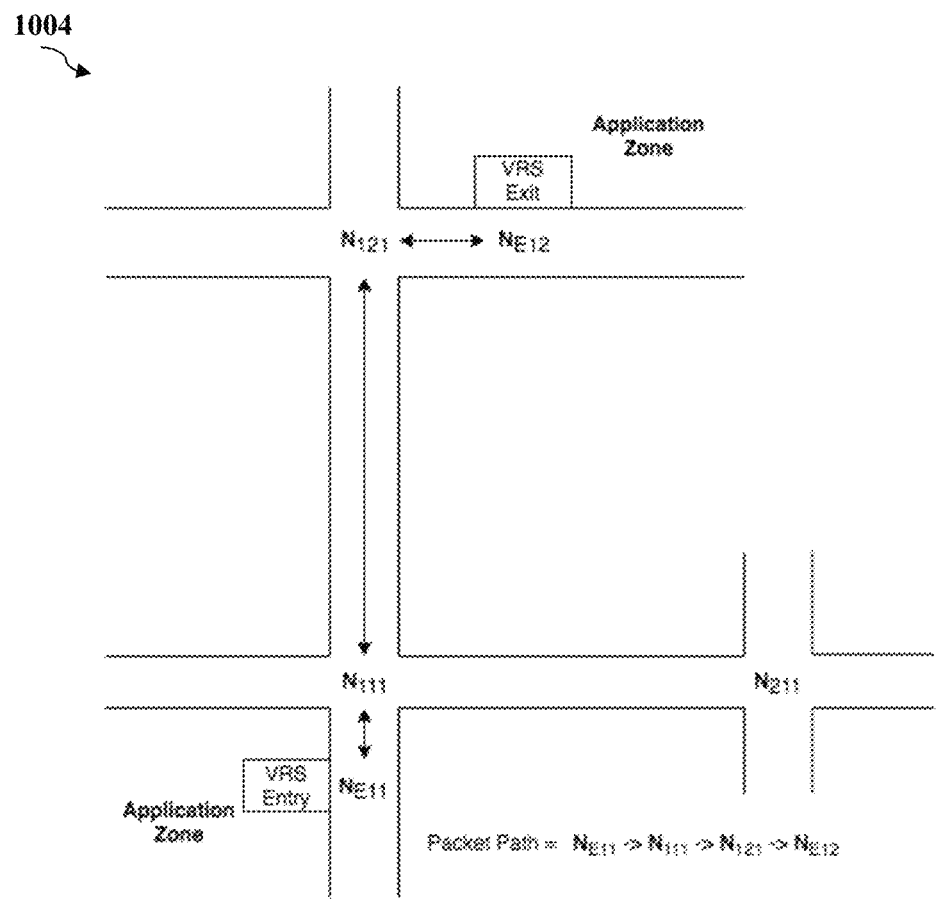
FIG. 14 illustrates a pictorial representation 1004 of a path created by packet path creation, according to an embodiment herein.

FIG. 14 illustrates a pictorial representation 1004 of a path created by packet path creation, according to an embodiment. The VRS routing modules can take requests from application user system to move the UVP from one application zone 901 to another. The routing modules can utilize the virtual roadways to move the UVP using time-division multiplexing (TDM) algorithms, to handle multiple requests on the virtual roadways. According to an embodiment, the VRS routing modules can include sub-modules, wherein the sub modules can include an UAS packet initialization, a packet path creation (PPC) and a packet routing.

According to an embodiment, the UAS packet initialization module can be configured to set the dimensions of the UAS packet and allocate it to the appropriate VRS layer depending on the UAS credentials. The size of the packet can vary depending on the physical dimensions and speed capabilities of the UAS. The UAS packet initialization module can pass on the source AZ exit point and destination AZ entry point to the PPC module for the creation of the path that the UPV takes on the VRS.

In an embodiment, the PPC module can be configured to compute the shortest path between the application entry point and the application exit point for path creation. Routing algorithms are used to compute the shortest path between nodes in a graph as long as the time to traverse connected nodes is known. The nodes on the VRS can be represented by the roadway intersection points where the N/S sub-layer intersects with the E/W sub-layer. The Average Travel Time (ATT) between nodes can be captured from the travel times of UVP using the VRS to get real-time feedback. The target path would be sent to the packet routing module to route the UAS Packet within the VRS.

Figure 15:
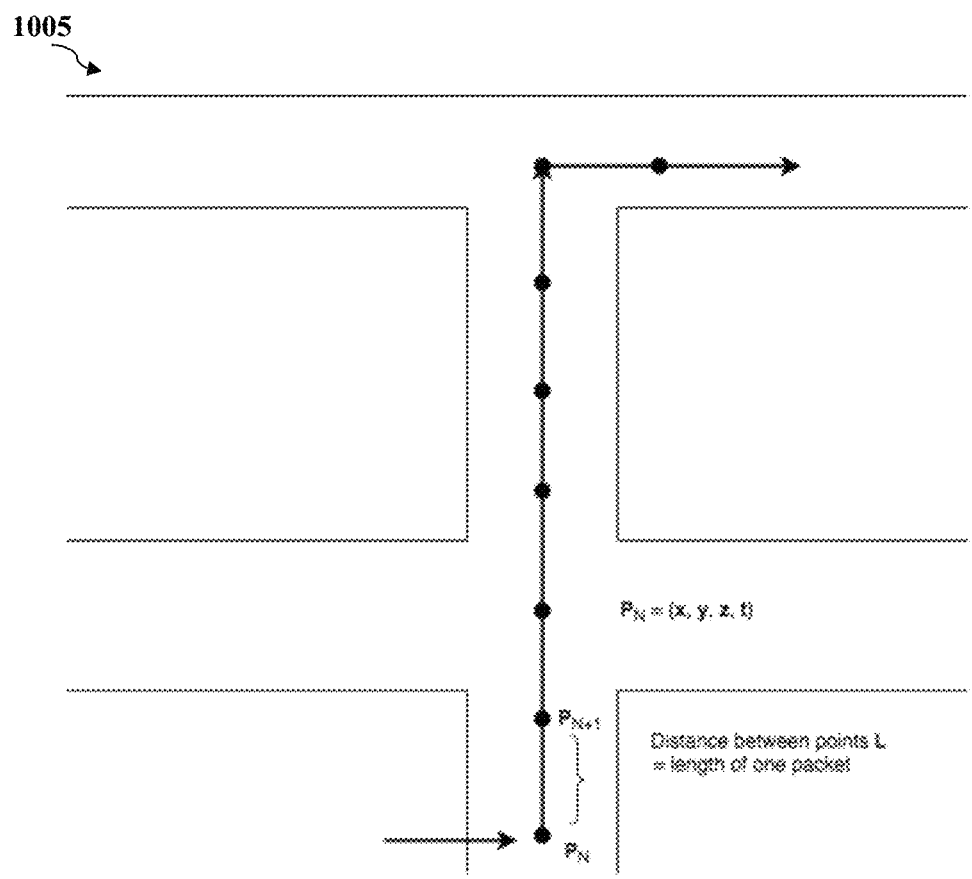
FIG. 15 illustrates a pictorial representation 1005 of a position path matrix of target path, according to an embodiment herein.

FIG. 15 illustrates a pictorial representation 1005 of a position path matrix of target path, according to an embodiment. The packet routing module can be configured for routing the UAS packet. The target path can be initially split into discrete segments approximately equal to one packet size (packet sizes may vary at implementation for different UAS devices). Splitting the path into discrete packet-sized segments can allow the packet routing module to use time-division multiplexing on the VRS for the handling of multiple packets. The target path can include GPS and altitude positioning as well as the expected time the UAS would be at the target position. The set of all the points would be the Position Path Matrix (PPM) of the target path.

The MLPU can be configured to send actual position coordinates to the VRS at regular intervals to update the packet routing module on its actual positioning. The packet routing module can be configured to ensure that the UAS packet is at the correct position and time intervals and updates the PPM accordingly if the UAS packet is moving too slowly or too quickly. In an embodiment, the UASs that are persistently too slow or too quick can be flagged for recalibration. The MLPU can also send the VRS its obstruction report. Persistent obstructions can be flagged and reported to authorities for investigation. If a permanent obstruction is blocking the path of the UAS, the packet routing module can request a new target path from the PPC and re-route the packet from that location. All other packets with target paths that are impeded by the permanent obstruction can be re-routed to a new optimal path as well. All permanent obstructions may be flagged for investigation and if the route is no longer available due to the obstruction, the VRM updated accordingly.

Figure 16:
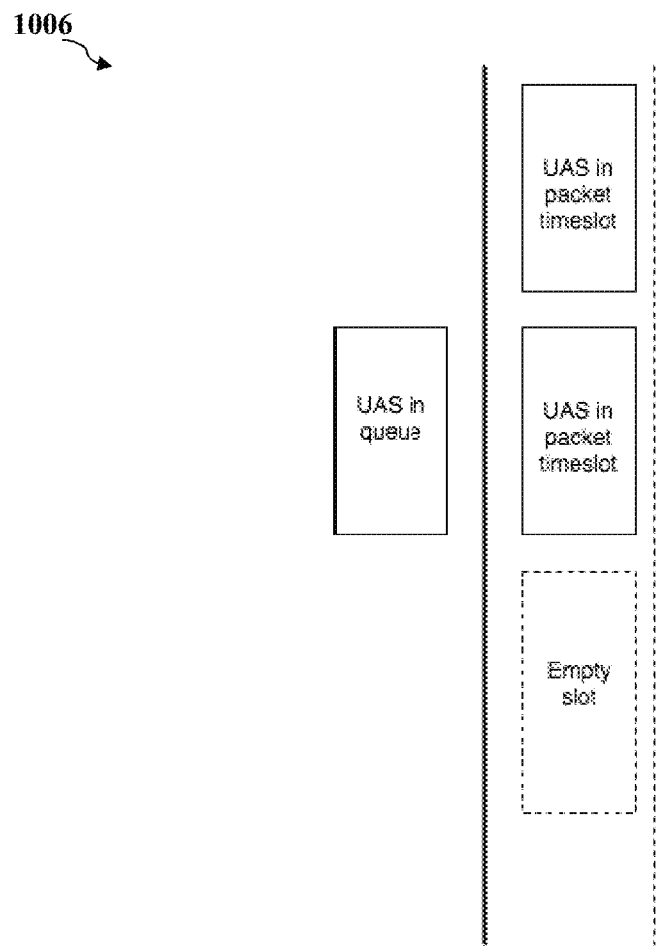
FIG. 16 illustrates a diagram 1006 showing packet routing module waiting for an available packet time-slot on path for the UAS packet to enter the new sub-layer of the VRS, according to an embodiment herein.

FIG. 16 illustrates a diagram 1006 showing packet routing module waiting for an available packet time-slot on path for the UAS packet to enter the new sub-layer of the VRS, according to an embodiment. Critical points along the PPM are the points where the UAS can enter the VRS from its queue, exits the VRS into the AZ queue, as well as any intersection points on the path that moves from the N/S sub-layer to move to the E/W sub-layer (and vice versa). The packet routing module may wait for an available packet time-slot on the path for the UAS packet to enter the new sub-layer of the VRS. In the cases where no packet slots are available, the UVP currently on the VRM may be slowed down to accommodate the merging of the current UVP.

Figure 17:
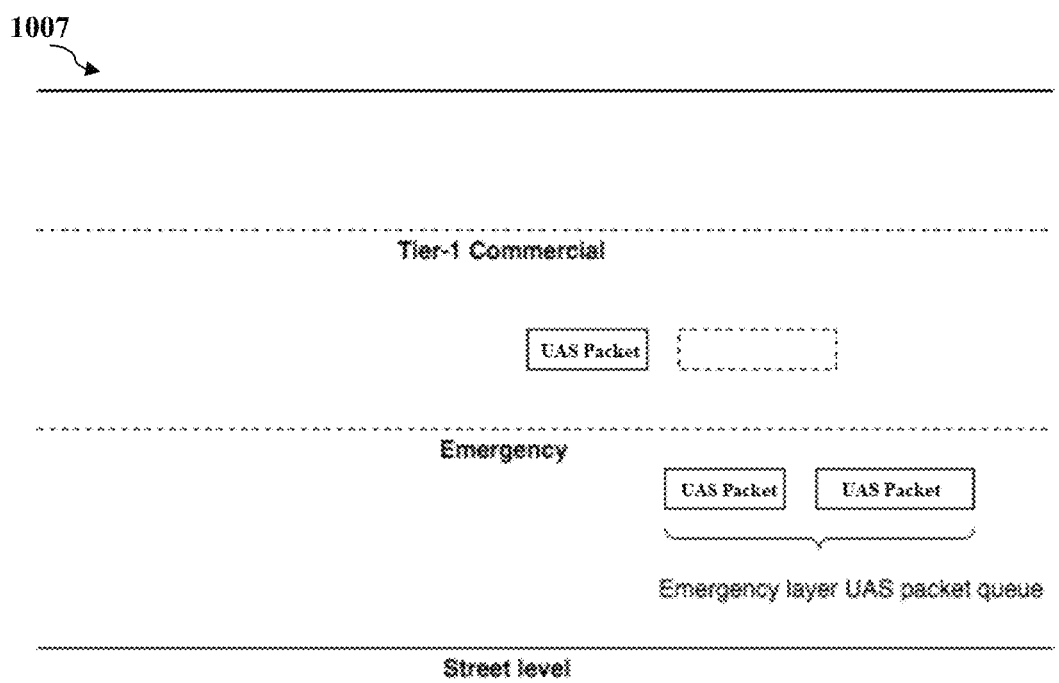
FIG. 17 illustrates a pictorial representation 1007 shows queuing during VRS route request, according to an embodiment herein.

FIG. 17 illustrates a pictorial representation 1007 showing queuing during VRS route request, according to an embodiment. The protocols for VRS communication with the O/S in an application zone can include a packet initialization module and a VRS route request module. On start-up, the UAS can connect with the VRS system and verify that the user and the UAS vehicle are appropriately licensed to operate within this AZ. Once the user and the UAS vehicle have been approved, the VRS can send the AZ packet parameters to UAS O/S. The specific parameters can vary depending on the inputs, i.e. application zone class (i.e. residential, hospital, park, etc . . . ), user licenses class, UAS vehicle class (i.e. weight classes), time of day, and weather conditions. All of the specific parameters can be stored in appropriate databases.

In an embodiment, the UAS can request the VRS to move from the Source AZ exit point queue to the Destination AZ entry point queue. The application user system can be configured to bring the UAS to the appropriate queue before handing off control of the UAS Packet to the VRS. The VRS can check to ensure that the UAS has appropriate clearance and power remaining to complete the route. Once verified, the VRS can send the new packet parameters to the O/S and take control of the UAS. Once the UAS Packet has traversed the VRS and exited at the appropriate AZ entry point, the VRS can release control of the UAS back to the application user system.

The computational complexity of routing the packets can increase as more packets enter the system. To reduce the computational complexity and administrative burden on any single VRS routing network, the packet routing modules can be sub-divided into divisions tier 1, tier 2 and additional modules (also referred as tiering of packet routing modules). More dense, and potentially higher traffic areas may be divided into smaller divisions while less dense, low traffic areas have larger subdivisions. Each division may responsible for the routing of the packets within its own sector and pass the packet along to neighbouring divisions until the packet reaches its ultimate destination.

The Tier 1 Module can be configured for routing the full path of the packet along with the entry points and exit of each division the packet enters to complete its trip from start to destination. The Tier 2 Module can be configured for the creation of the actual routed paths within its VRS Network. The entry point and exit point for each division can be assigned by the Tier 1 Module. Additional tiers can be created to further reduce the computational burden for the upper tiers if required due to increased traffic and computational requirements.

Figure 18:
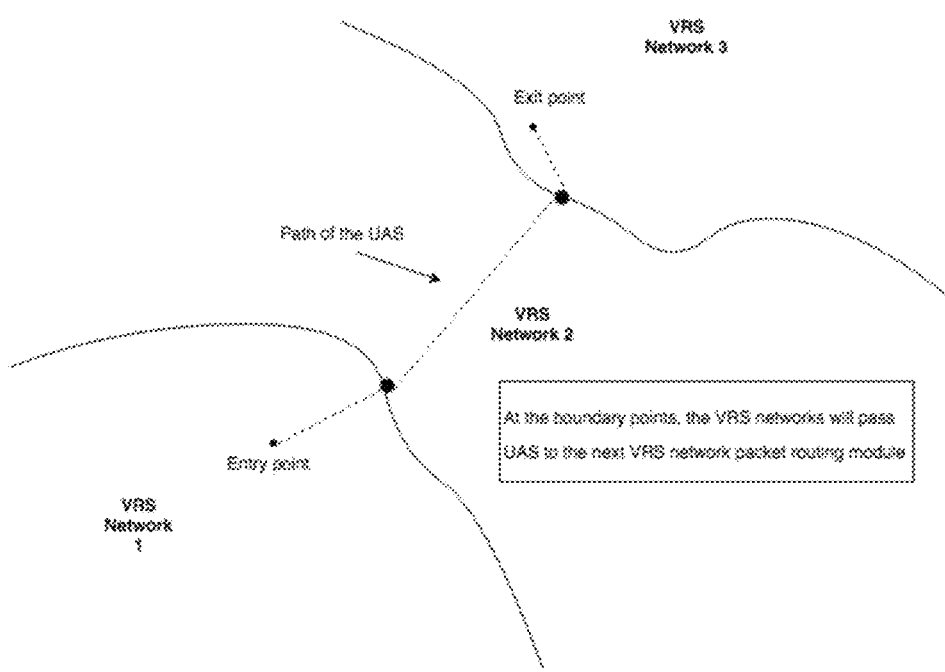
FIG. 18 illustrates a pictorial representation 1008 showing Internetworking of VRS protocols, according to an embodiment herein.

FIG. 18 illustrates a pictorial representation 1008 showing Internetworking of VRS protocols, according to an embodiment. These protocols can allow for the seamless transition of the UVP from one VRS network to another, thus allowing the UVP to traverse multiple different VRS networks to arrive at its destination. At the boundary points of the VRS networks, the UAS packet can be re-initialized to the parameters and requirements for the new VRS network. Internetworking of VRS networks can allow for the building of smaller networks for the packet routing module which decreases the computational complexity of routing the UAS packets within its network. The movement of the UAS packets within the VRS networks is facilitated by VRS packet re-initialization module, i.e. the VRS packet re-initialization module is configured to move the UAS packet from one packet routing network to another.

In an embodiment, the VRS packet re-initialization module can be configured to move the UAS packets from one packet routing network to another. At the boundary point of the VRS networks, the UAS can reinitialize packet parameters to those permitted in the new VRS network. Different networks may have different requirements for packet size dimensions or speed due to the requirements of various conditions such as zoning rules and environmental conditions. Once the packet has been re-initialized, the UAS packet controls may be handed over to the new VRS network packet routing module.

In an embodiment, each time an obstruction is detected on the VRS network, the UAS O/S can send an obstruction report to the VRS. If an obstruction persists in causing UVP on the VRS to maneuver off of its set course, said obstruction can be flagged within the VRS system. The VRS system can assist regulatory bodies to detect potential UASs that are flying within the VRS without proper licensing. If an obstruction is not allowing an UVP from reaching its destination, the obstructions can be flagged and reported and the UVP may be re-routed to reach its destination.

The government and regulatory database can include but not limited to user licenses (Class of license depending on UAS Pilot training), UAS registration licenses, parameters for UAS Class Types (VLOS vs BVLOS, top speed, stability, maximum altitude), parameters for specific application zones (packet dimensions, speed limits, min/max height, UAS types allowed and User licenses type allowed) and parameters for specific VR zones (packet dimensions, speed limits, UAS types allowed and User license types allowed).

Figure 19:
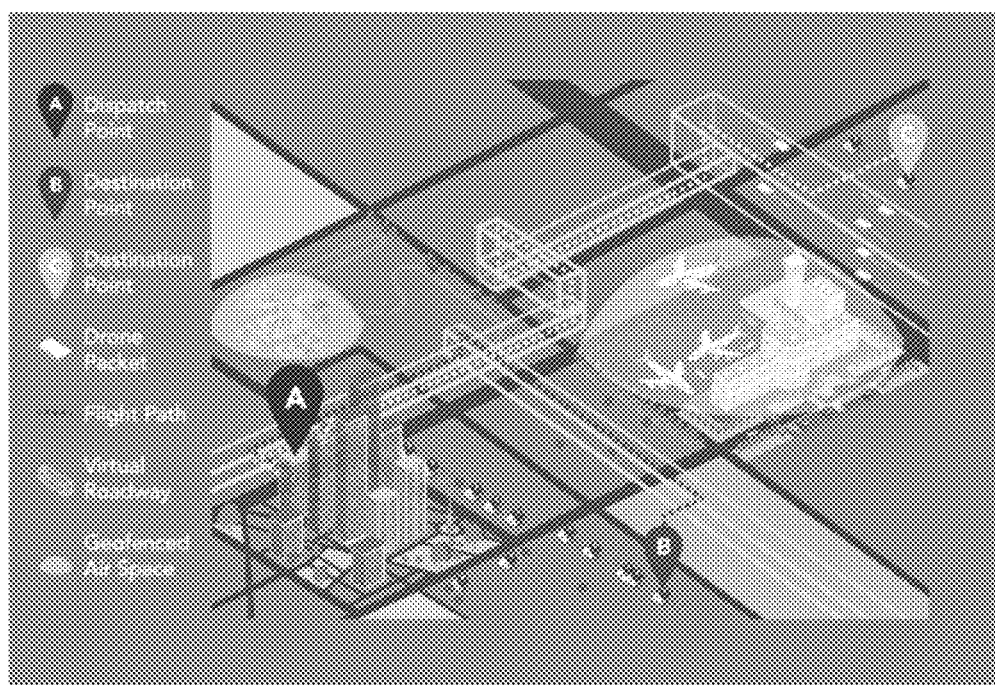
FIG. 19 illustrates a pictorial representation 1009 showing an application of the control system for controlling unmanned aircraft systems, according to an embodiment herein.

FIG. 19 illustrates a pictorial representation 1009 showing an application of the control system for controlling unmanned aircraft systems, according to an embodiment. Every operator must authenticate to enter the airspace. Regulated infrastructure can have full awareness of constraints in the airspace including all operations, geofence areas, obstructions and weather conditions. Drones or unmanned aircrafts avoid each other and other potential obstructions with adequate safety boundaries.

A main advantage of the present disclosure is to prevent collision from route conflict with multiple unmanned aircraft operators attempting to utilize the same airspace.

Still another advantage of the present disclosure is to prevent unauthorized access of UAS into areas without the appropriate permission.

Yet another advantage of the present disclosure is to create geofence geographic areas and making available to user(s) all traffic data digitally using the centralized servers.

Another advantage of the present disclosure is to monitor and set permission level for geographic zones.

Another advantage of the present disclosure is to decrease the amount of idling time with multiple unmanned aircrafts using the same airspace by using algorithms to sequence and direct the movements of aircrafts through time division multiplexing.

Another advantage of the present disclosure is to reduce administrative burden on the government since appropriate licensing, insurance and other certifications that are automatically checked against an online database.

Another advantage of the present disclosure is to create permanent geo-fencing areas around airports, military complexes, government buildings etc . . . .

Another advantage of the present disclosure is to create temporary geo-fencing areas for short-term events and environmental factors.

Another advantage of the present disclosure is to regulate and monitor licensing, through UAS O/S so that untrained pilots cannot operate the UAS in designated areas Another advantage of the present disclosure is to allow authorized UAS into specific application areas while blocking unauthorized UAS Another advantage of the present disclosure is to allow the government to monitor operational viability of the UAS.

Another advantage of the present disclosure is to create a layered VRS at relative altitudes to create specially designated virtual roads that can be used by government/emergency vehicles while other roads can be designated for commercial traffic.

Another advantage of the present disclosure is that multiple commercial applications can use the same VRS at the same time without danger of crashing into each other.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A control system for enabling usage of simplified multiplexing-based packet routing approaches by independently controlling (i) local movement of an unmanned autonomous system (UAS) that operates in an environment with other unmanned autonomous systems tracked by a base station or traffic control devices within a physical space defined by a virtual packet and (ii) path movement of the virtual packet instructed by the base station or the traffic control devices, the control system comprising:

an operating system embedded into a UAS hardware layer residing on or coupled to the UAS to control the operation of the UAS, the operating system or the base station or traffic control devices configured for establishing the virtual packet defining the physical space established around the UAS as the UAS travels within the environment, the virtual packet having zone packet parameters establishing a proximity boundary based on one or more characteristics of at least one of the UAS or obstructions determined within the physical space of the virtual packet, the proximity boundary of the virtual packet encapsulating a volume greater than a physical volume of the UAS, the operating system controlling the movement of the UAS only within the proximity boundary of the virtual packet to account for local conditions or local obstructions experienced by the UAS within the proximity boundary of the virtual packet;

wherein a representation of the virtual packet or a physical location of the UAS is transmitted to the base station or traffic control devices corresponding to a present location of the UAS, the base station or traffic control devices configured to route the UAS in conjunction with the other unmanned autonomous systems based on a virtual roadway map data structure having a plurality of traffic corridors for routing the unmanned autonomous systems, each of the UAS and the other unmanned autonomous systems tracked as simple two dimensional or three dimensional polygonal objects defined by the virtual packet travelling within the virtual roadway map data structure and the plurality of traffic corridors, such that control tasks along paths defined by the plurality of traffic corridors are divided between (i) the base station or the traffic devices controlling positioning of the virtual packet corresponding to the UAS along a path in the virtual roadway map data structure through routing instructions and (ii) the operating system controlling the movement of the UAS within the proximity boundary of the virtual packet;

wherein the base station or the traffic devices controlling positioning of the virtual packet corresponding to the UAS along a path in the virtual roadway map data structure through routing instructions utilize multiplexing algorithms to sequence and direct the path movement of the virtual packets, each virtual packet represented by the two dimensional or three dimensional polygonal or polyhedral objects corresponding to a plurality of UAS using a same airspace as defined by positions along the virtual roadway map data structure while the local movement of each UAS of the plurality of UAS is controlled by a corresponding on-board operating system to avoid collisions and obstructions within a boundary of the virtual packet;

wherein a processor onboard the UAS is configured for controlling positioning of the UAS within the virtual packet as the UAS travels along the path in accordance with routing instructions generated based at least on the routing of the virtual packet, the path generated by the processor to avoid objects within the virtual packet that do not block an entirety of a leading edge of the virtual packet.

2. The control system of claim 1, wherein the proximity boundary of the virtual packet is defined based on speed capabilities of the UAS to define the physical space based at least on a safety multiple of a minimum safe distance to obstructions within a boundary of the virtual packet.

3. The control system of claim 1, wherein the proximity boundary of the virtual packet is defined based on a determination, by the operating system, of whether a visible line of sight (VLOS) is established between an operator of the UAS and the UAS.

4. The control system of claim 3, wherein the virtual roadway map data structure includes a plurality of different layers of corridors, each layer of corridors representing a different altitude upon which the UAS can travel within.

5. The control system of claim 4, wherein the proximity boundary of the virtual packet is defined based at least on which layer of corridors of the plurality of different layer of corridors the UAS is travelling within or a geospatial level in which the UAS is travelling within.

6. The control system of claim 4, wherein the plurality of different layer of corridors the UAS are generated based on replicating a base layer of corridors.

7. The control system of claim 1, wherein the proximity boundary of the virtual packet is defined based on an ability of the UAS to stabilize in response to detected environmental characteristics, including at least one of wind speed, air pressure, presence of animals, or relative humidity.

8. The control system of claim 1, wherein the base station or the traffic control devices transmit operating characteristics to the operating system that define parameters that modify the proximity boundary of the virtual packet.

9. The control system of claim 8, wherein the operating characteristics include at least one of UAS class types, zone-based jurisdictional modifiers, or user license type of an operator of the UAS.

10. The control system of claim 1, wherein the polygonal or polyhedral objects include cuboid objects.

11. The control system of claim 10, wherein the processor is a machine learning processor (MLP) that is configured for controlling operation of the UAS within the virtual packet by dynamically minimizing an error term based on a centroid of the virtual packet such that the UAS is biased to move in the selected path within the virtual packet that is closest to the centroid of the virtual packet as the virtual packet is being routed in accordance with the virtual roadway map data structure, the centroid of the virtual packet representing a target position of the UAS.

12. The control system of claim 10, wherein the processor is a machine learning processor (MLP) configured for object recognition to determine whether an obstruction blocking the entirety of the leading edge of the virtual packet is a temporary obstruction or a permanent obstruction, and responsive to a determination that the obstruction is a permanent obstruction, generating a data message for transmission to the base station or the traffic control devices to request updated routing instructions.

13. The control system of claim 1, wherein the base station or the traffic control devices transmit data sets representing the virtual roadway map data structure having the plurality of traffic corridors and other unmanned autonomous systems operating within the virtual roadway map data structure, and the base station or the traffic control devices are configured to provide a set of points for navigating the path between a source entry point in the virtual roadway map data structure and a destination exit point in the virtual roadway map data structure, and the operating system is configured to navigate the UAS along the path provided by the set of points.

14. The control system of claim 1, wherein the UAS is controlled in accordance with the base station or the traffic control devices and the virtual roadway map data structure only when the UAS travels within an area defined by the virtual roadway map data structure.

15. The control system of claim 14, wherein one or more locations existing outside the area defined by the virtual roadway map data structure are defined as different application zones where operator control of routing of the UAS is possible, and available paths within the virtual roadway map data structure are established as paths between the different application zones; and wherein when the UAS is travelling within the area defined by the virtual roadway map data structure, the operator control of the routing of the UAS is disabled.

16. The control system of claim 1, wherein subdivided positions along the virtual roadway map data structure within the plurality of corridors are discrete segments based at least on approximately a size of the virtual packet.

17. The control system of claim 1, wherein the operating system is configured to request a new path from the base station or the traffic control devices within the virtual roadway map data structure when the operating system detects permanent obstruction blocking the path of the virtual packet within which the UAS will travel.

18. The control system of claim 1, wherein the virtual packet is dynamically resized as the UAS travels within the virtual roadway map data structure and the plurality of traffic corridors.

19. The control system of claim 1, wherein the virtual packet is dynamically resized responsive to altitude level changes when the UAS travels within the virtual roadway map data structure and the plurality of traffic corridors.

20. The control system of claim 1, wherein the virtual packet is dynamically resized responsive to weather conditions.

* * * * *